US010583957B2

(12) United States Patent
Akhavan-Tabassi

(10) Patent No.: US 10,583,957 B2
(45) Date of Patent: Mar. 10, 2020

(54) KNOCKDOWN CONTAINERS AND DISPLAYS WITH OPTIONAL LIGHTING FEATURES

(71) Applicant: Payman Akhavan-Tabassi, Rockwood (CA)

(72) Inventor: Payman Akhavan-Tabassi, Rockwood (CA)

(*) Notice: Subject to any disclaimer, the term of this patent is extended or adjusted under 35 U.S.C. 154(b) by 96 days.

(21) Appl. No.: 15/750,511

(22) PCT Filed: Aug. 12, 2016

(86) PCT No.: PCT/CA2016/000206
§ 371 (c)(1),
(2) Date: Feb. 6, 2018

(87) PCT Pub. No.: WO2017/024379
PCT Pub. Date: Feb. 16, 2017

(65) Prior Publication Data
US 2018/0222628 A1 Aug. 9, 2018

Related U.S. Application Data

(60) Provisional application No. 62/204,289, filed on Aug. 12, 2015, provisional application No. 62/237,702, filed on Oct. 6, 2015.

(51) Int. Cl.
B65D 6/24 (2006.01)
A47B 47/00 (2006.01)
(Continued)

(52) U.S. Cl.
CPC .......... B65D 11/1873 (2013.01); A47B 47/00 (2013.01); A47B 47/0041 (2013.01);
(Continued)

(58) Field of Classification Search
CPC ........ B65D 11/1873; B65D 7/30; B65D 7/32; B65F 2220/101; B65F 2220/139;
(Continued)

(56) References Cited

U.S. PATENT DOCUMENTS 3,050,194 A * 8/1962 Sinninger .............. A47B 47/03
108/106
4,171,058 A 10/1979 Collins
(Continued)

FOREIGN PATENT DOCUMENTS

FR 2312723 A1 12/1976
GB 2436603 A 10/2007
WO 2010052549 A1 5/2010

OTHER PUBLICATIONS

International Search Report & Written Opinion in PCT/CA2016/000206 dated Oct. 26, 2016.

Primary Examiner — Andrew T Kirsch
(74) Attorney, Agent, or Firm — Manelli Selter PLLC; Edward Stemberger

(57) ABSTRACT

A knockdown container or display in the shape of a 3-dimensional container is provide which comprises of two main element types, namely Sheet elements and Edge elements. In this design, all of the main elements of the container are joined one to another by sliding with respect to each other in a sequence that make an open or closed display or container that can easily assembled or disassembled. In particular, the edges of the Sheet elements have a shape that is fitted into matching slots of the Edge elements. The position and orientation of elements are such that they securely restrict unwanted movement of the elements with respect to one another, while minimizing the number of needed fasteners or number of additional restricting components needed to secure the Edge elements.

19 Claims, 16 Drawing Sheets

(51) Int. Cl.
  *B65D 6/16* (2006.01)
  *B65D 6/26* (2006.01)
  *A47F 3/12* (2006.01)
  *F16B 12/02* (2006.01)
  *A47F 3/00* (2006.01)
  *A47F 3/06* (2006.01)

(52) U.S. Cl.
  CPC .............. *A47F 3/001* (2013.01); *A47F 3/004* (2013.01); *A47F 3/06* (2013.01); *A47F 3/12* (2013.01); *B65D 7/24* (2013.01); *B65D 7/32* (2013.01); *B65D 9/12* (2013.01); *B65D 9/24* (2013.01); *F16B 12/02* (2013.01); *A47F 3/005* (2013.01)

(58) Field of Classification Search
  CPC ............ A47B 47/0008; A47B 47/0016; A47B 47/0025; A47B 47/0033; A47B 47/005
  See application file for complete search history.

(56) References Cited

U.S. PATENT DOCUMENTS

| | | | | |
|---|---|---|---|---|
| 5,580,181 A | * | 12/1996 | Nomura | A47B 47/0016 403/170 |
| 5,722,551 A | * | 3/1998 | Cocciemiglio, Jr. | B65D 9/24 220/4.33 |
| 2005/0006991 A1 | | 1/2005 | Saravis | |

* cited by examiner

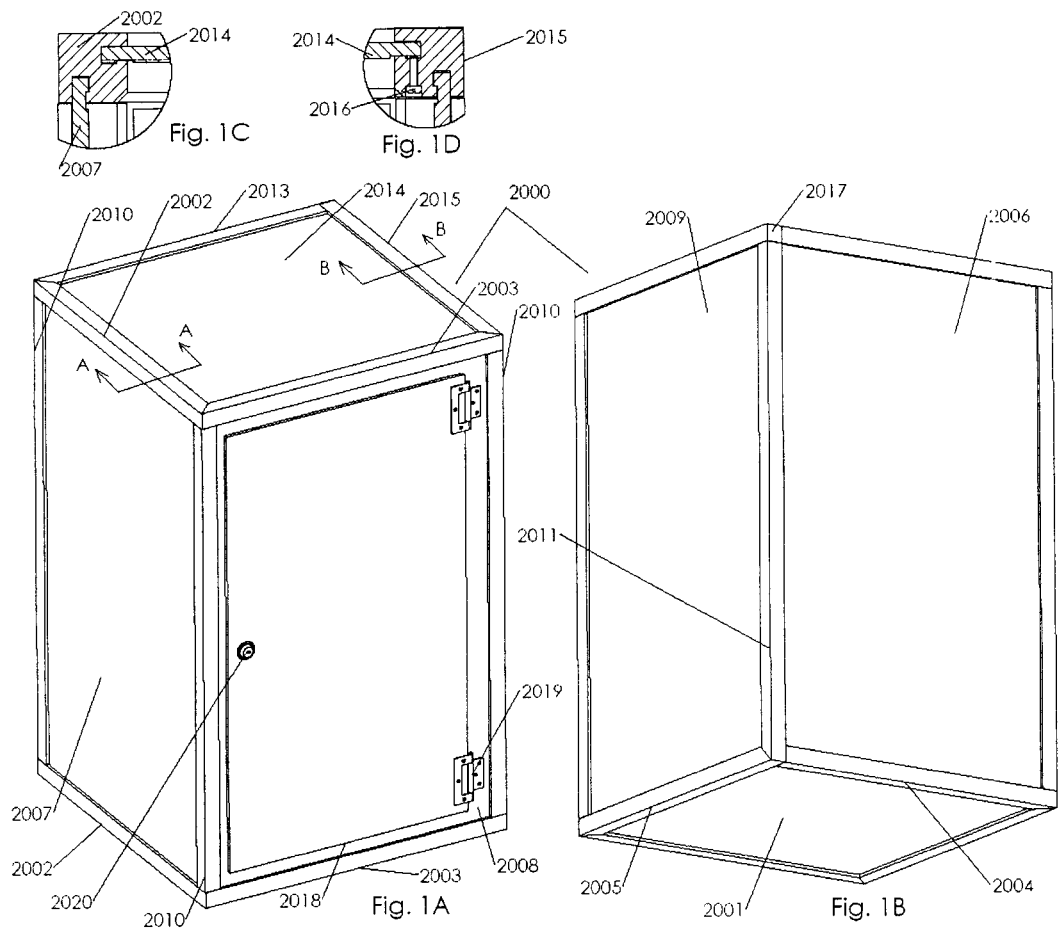
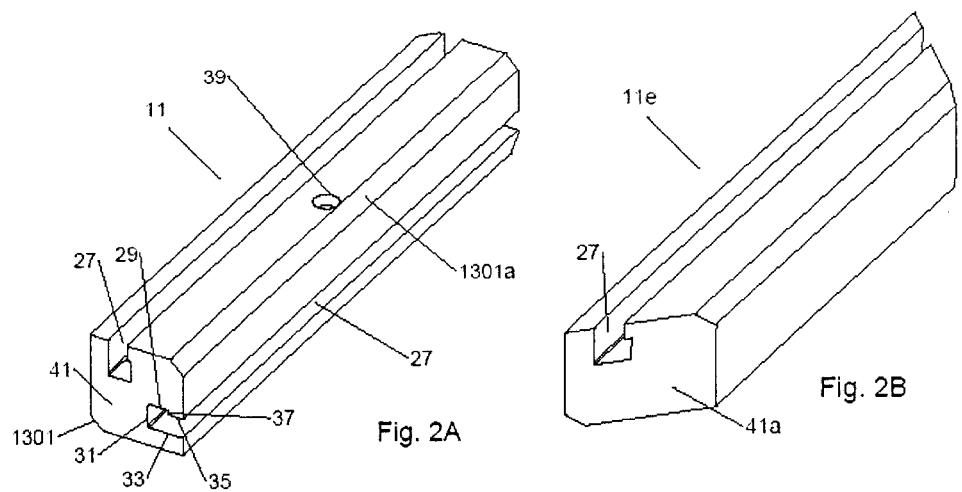

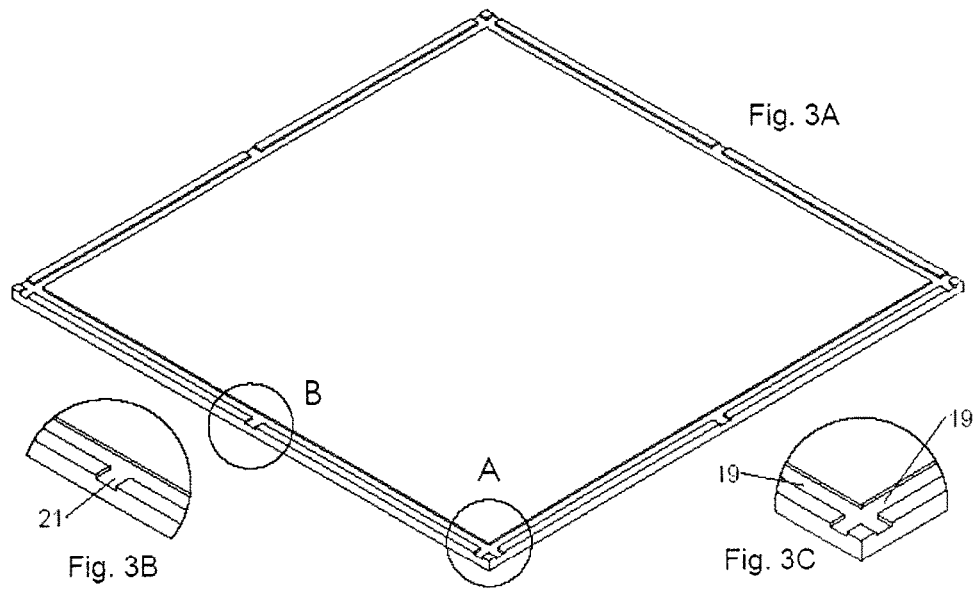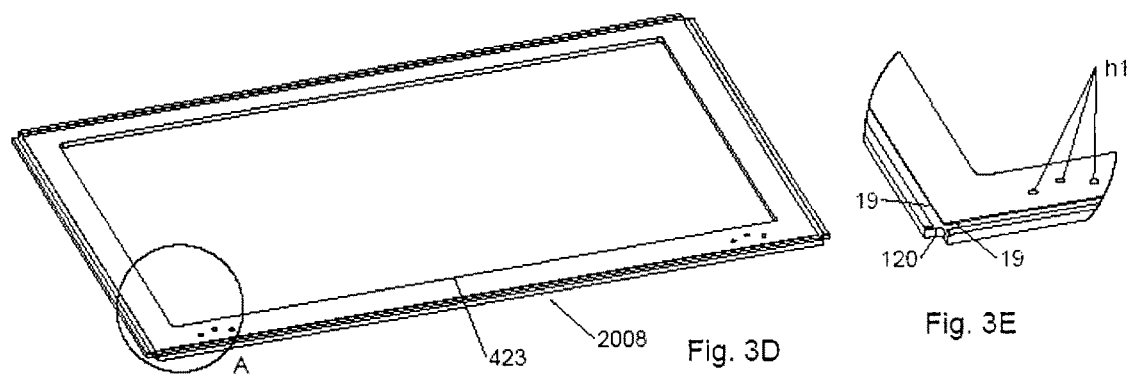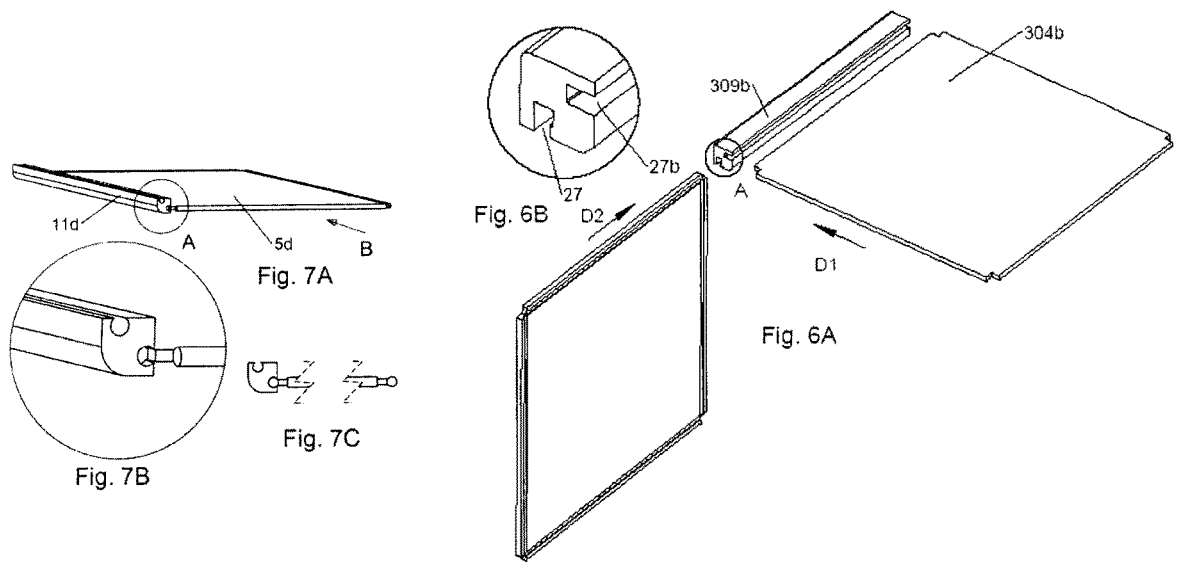

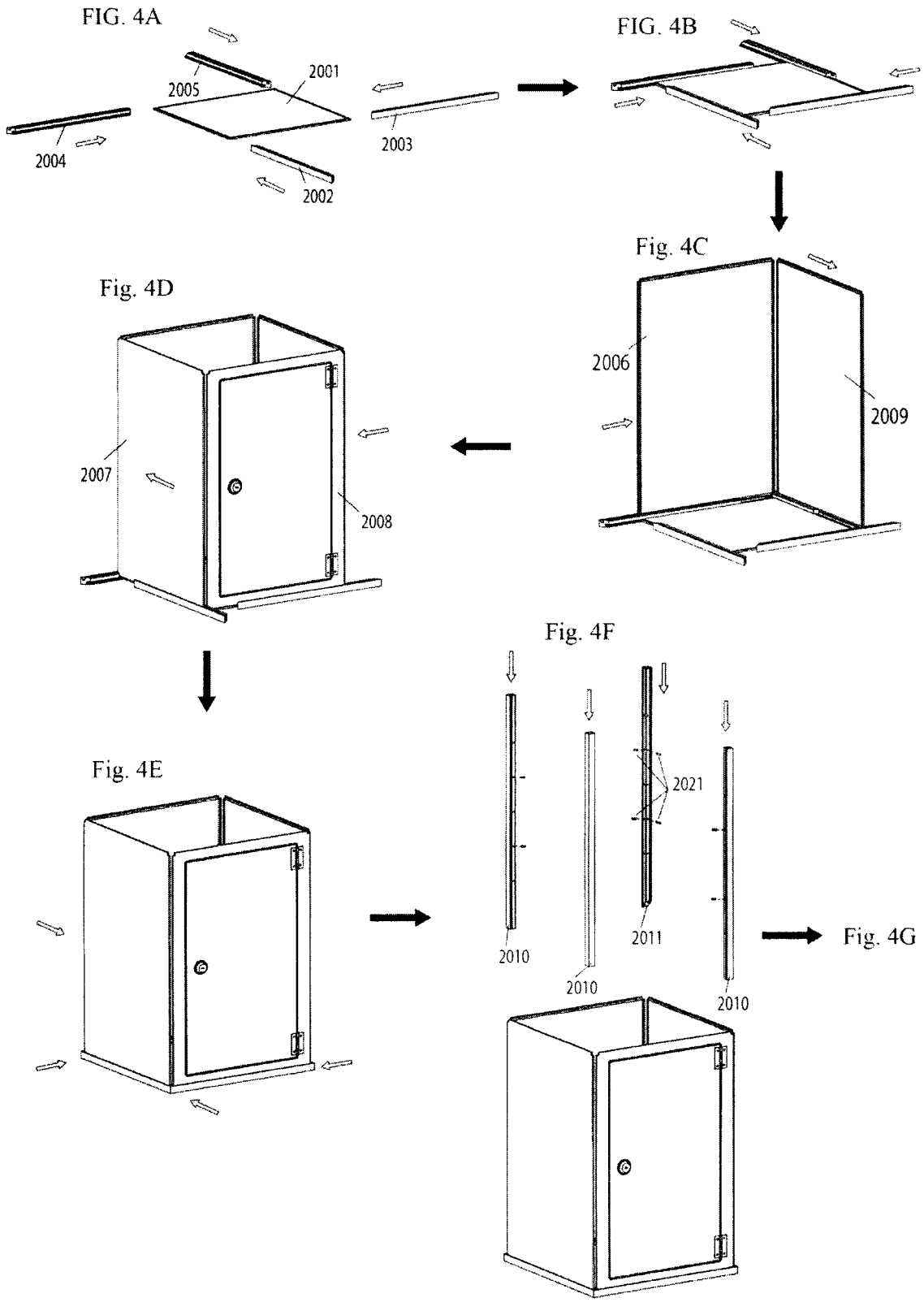

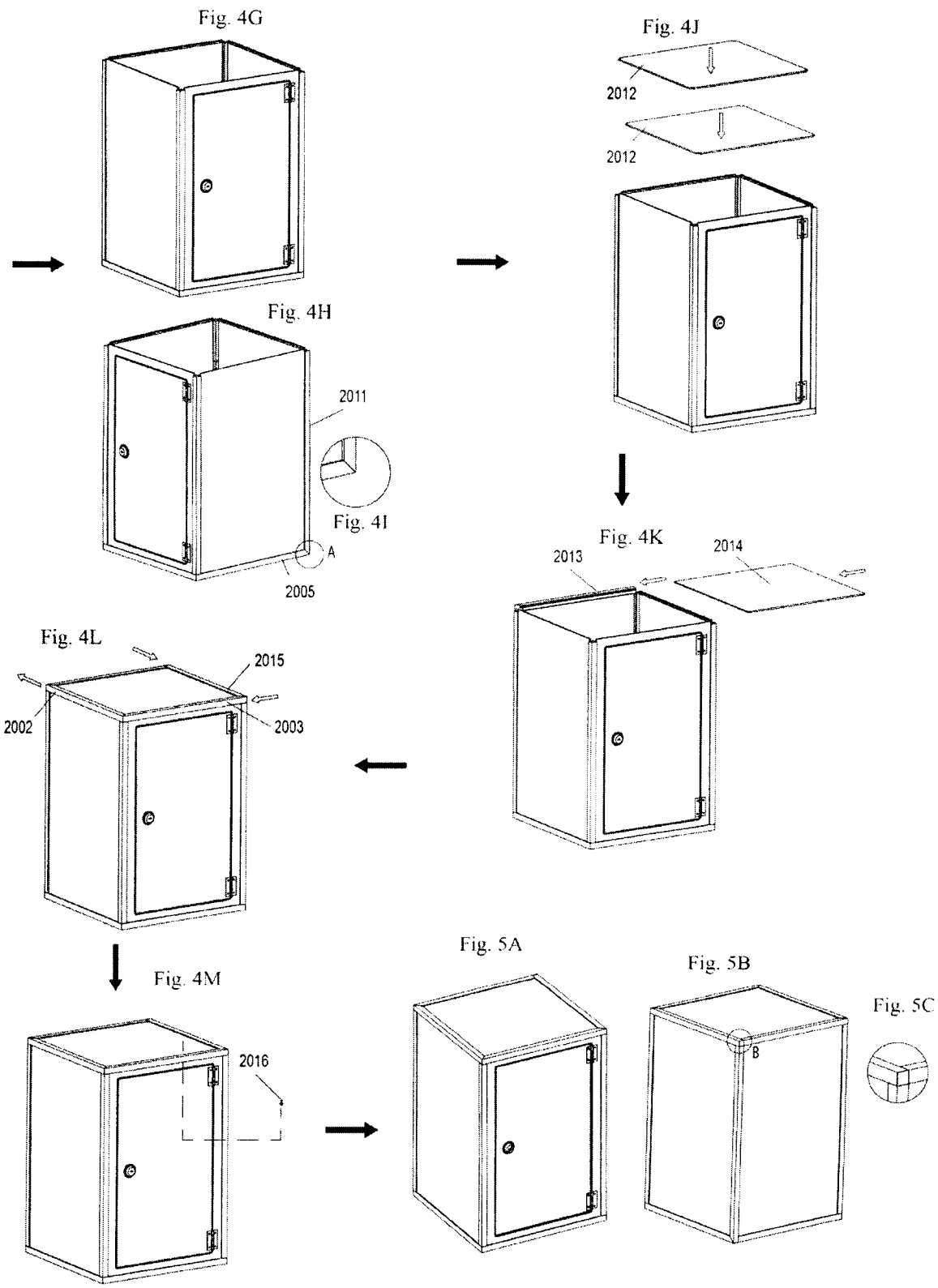

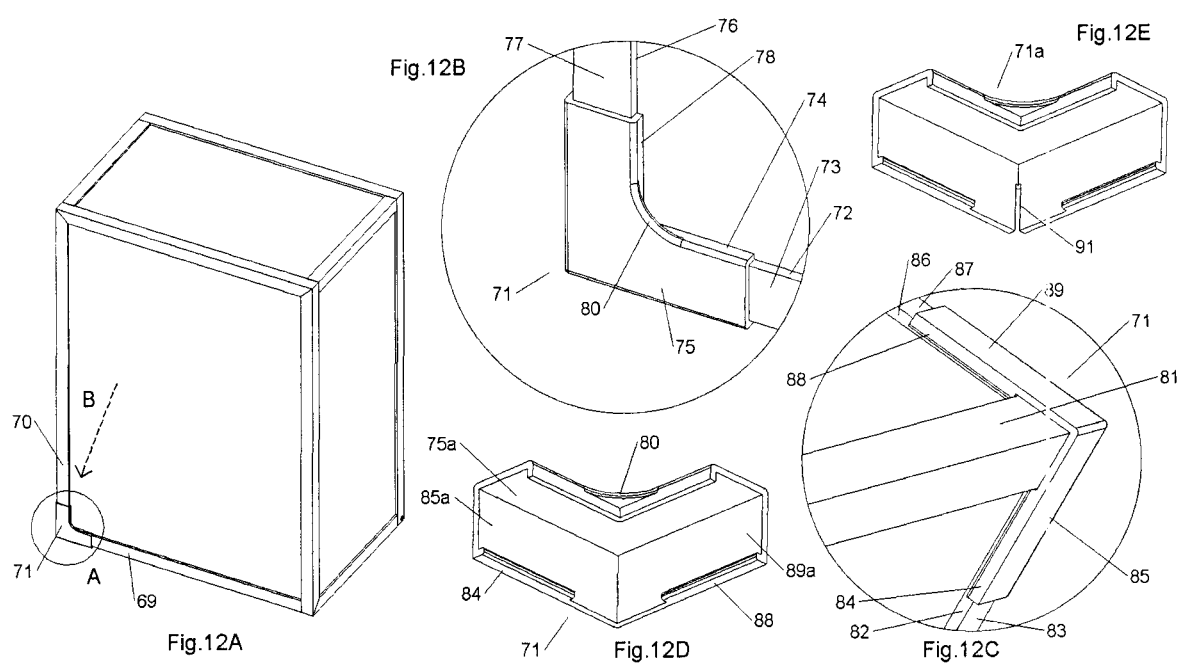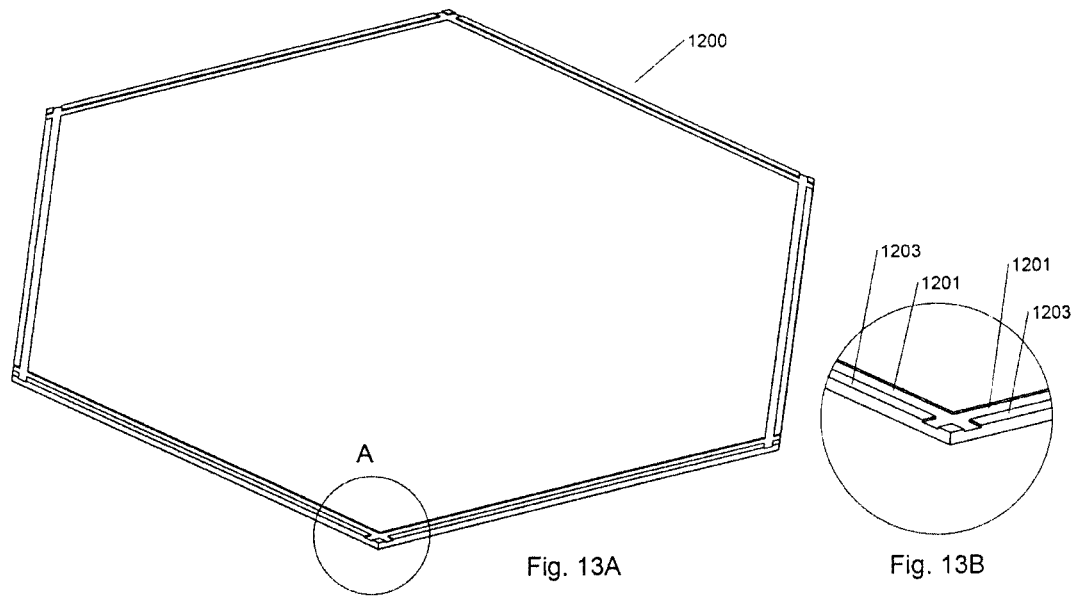

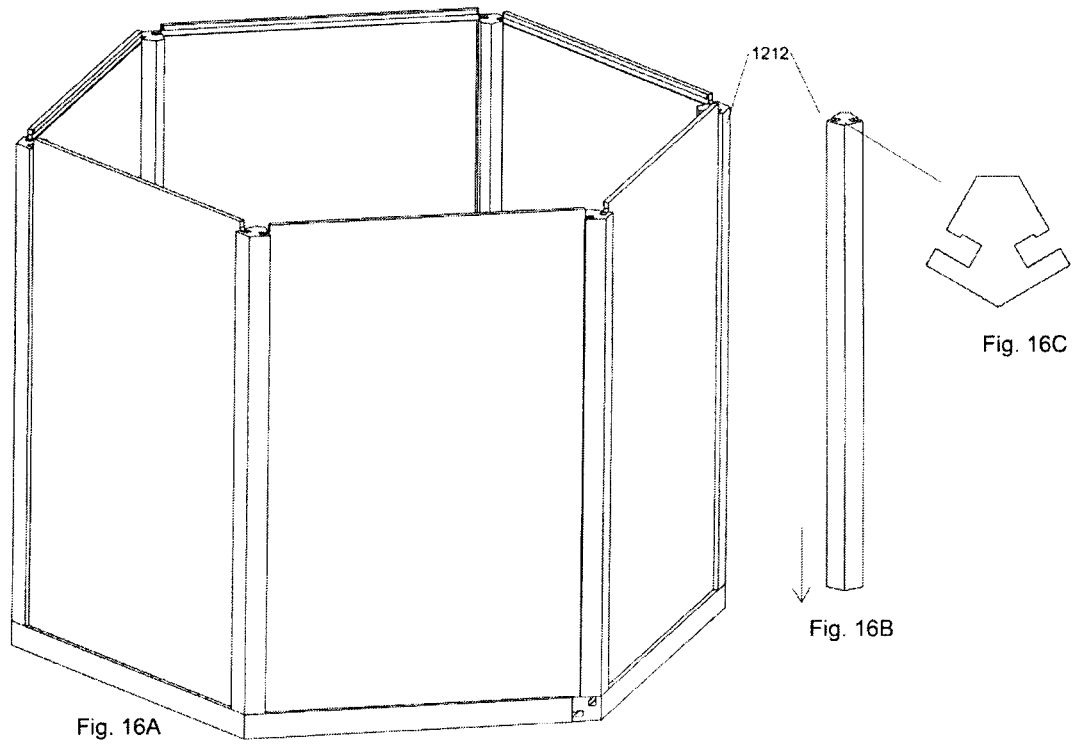
Fig. 16C
Fig. 16B
Fig. 16A
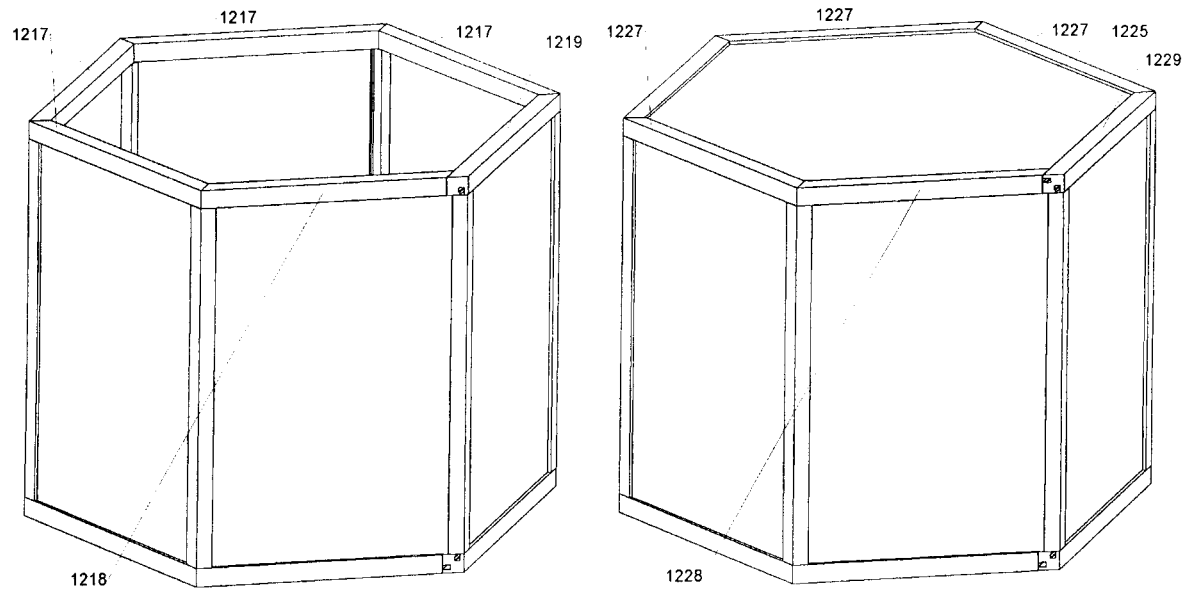
Fig. 17
Fig. 18

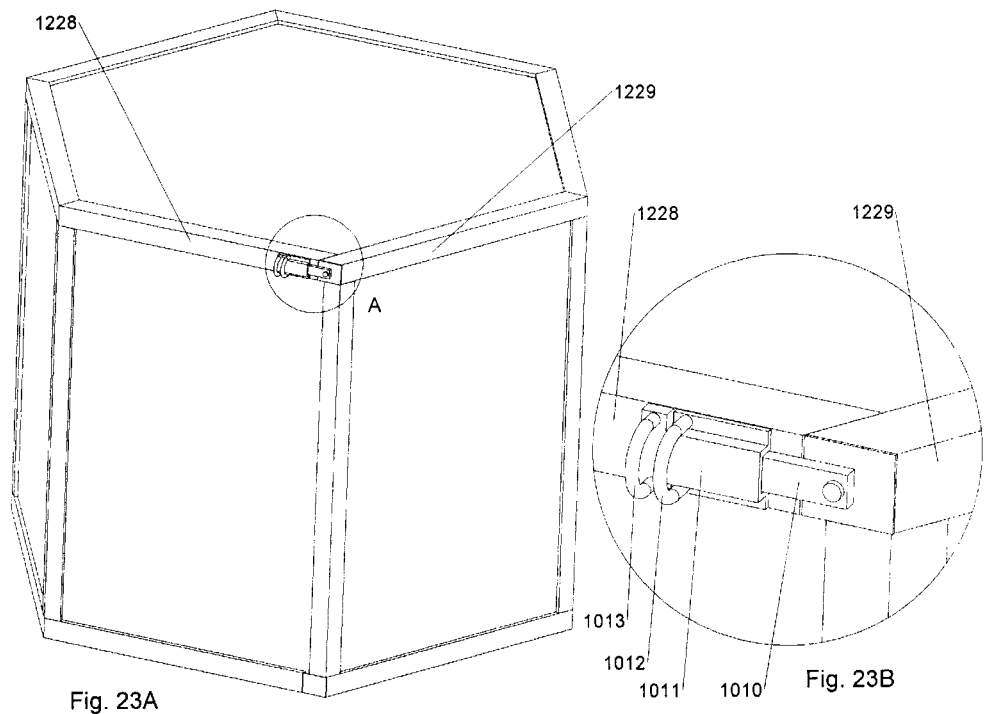
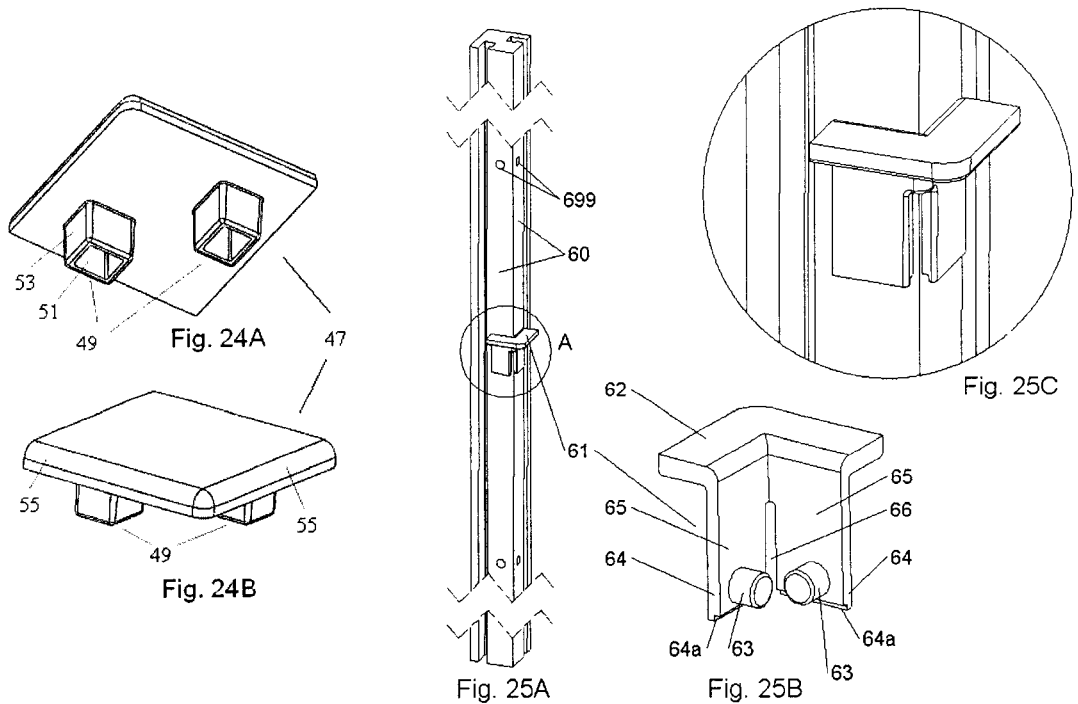

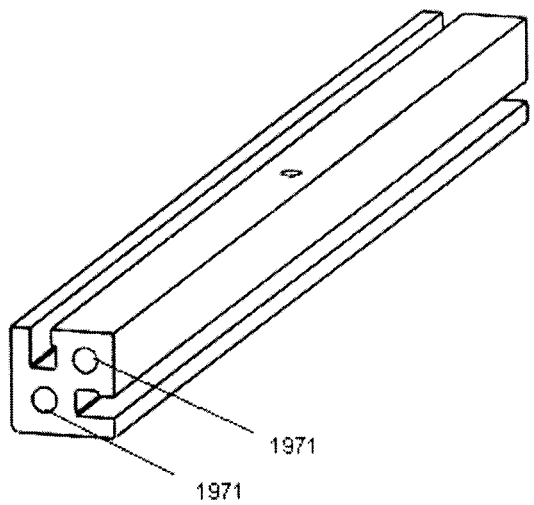
Fig. 26A
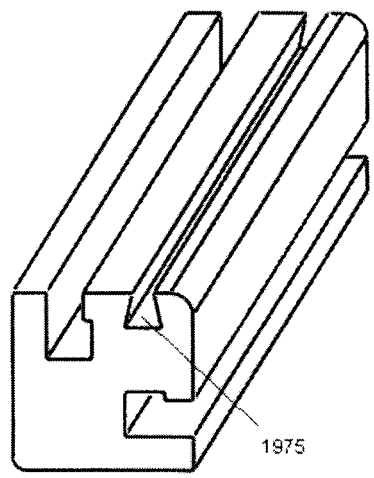
Fig. 26B
Fig. 27A  Fig. 27B  Fig. 27C  Fig. 27D
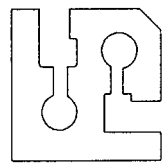 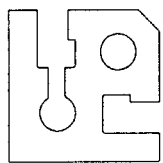 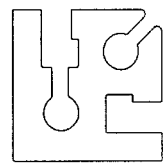 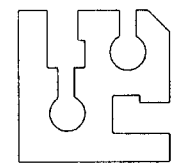
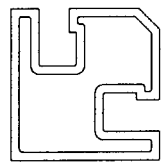 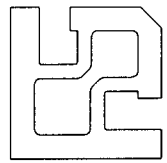
Fig. 27E  Fig. 27F
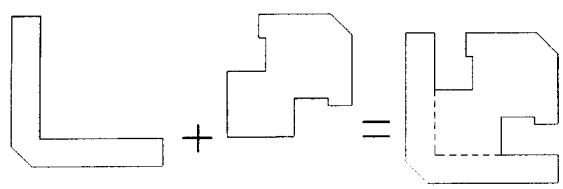
Fig. 28
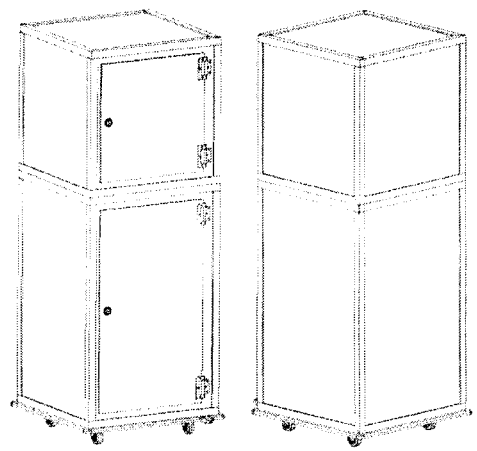
Fig. 29E  Fig. 29F

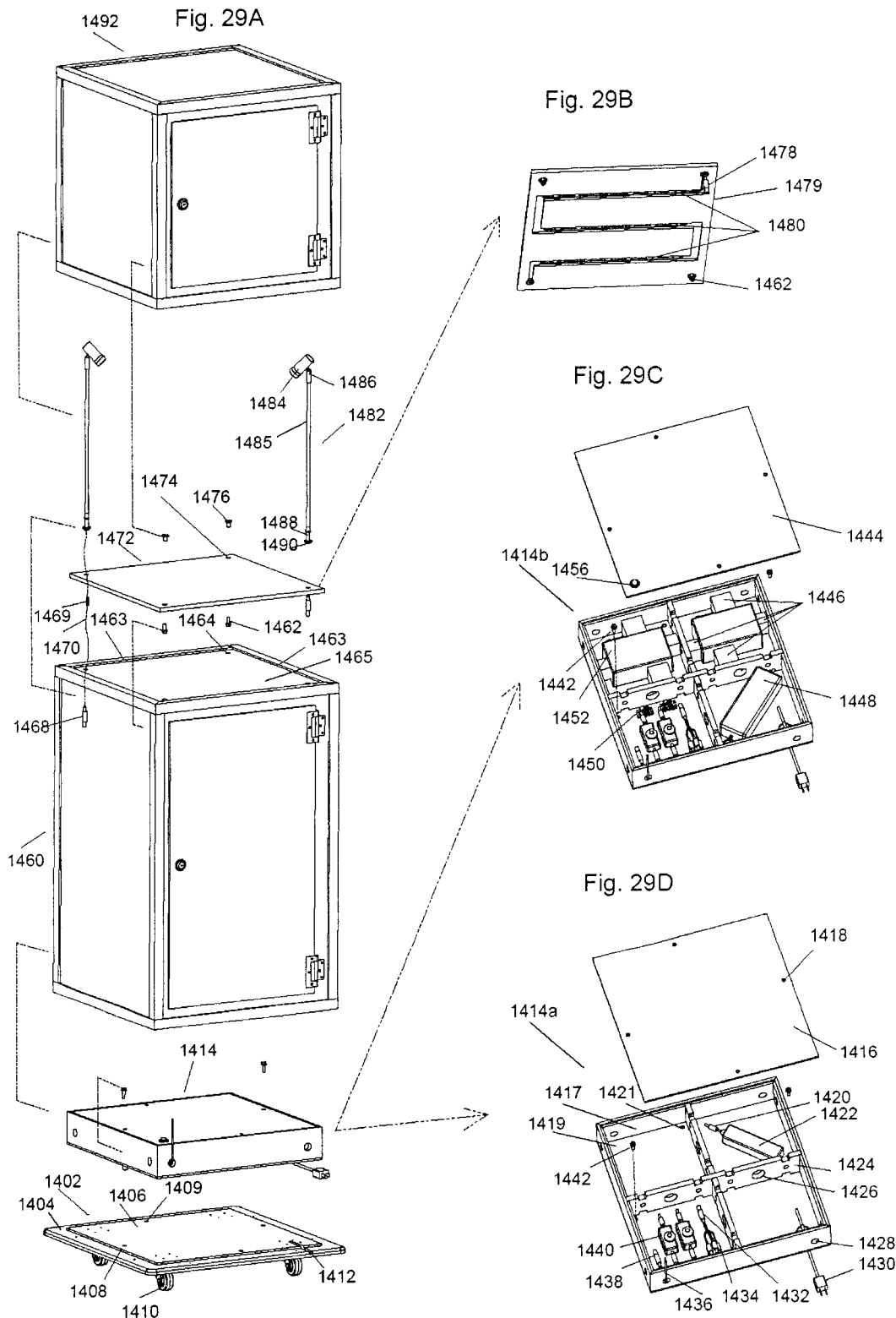

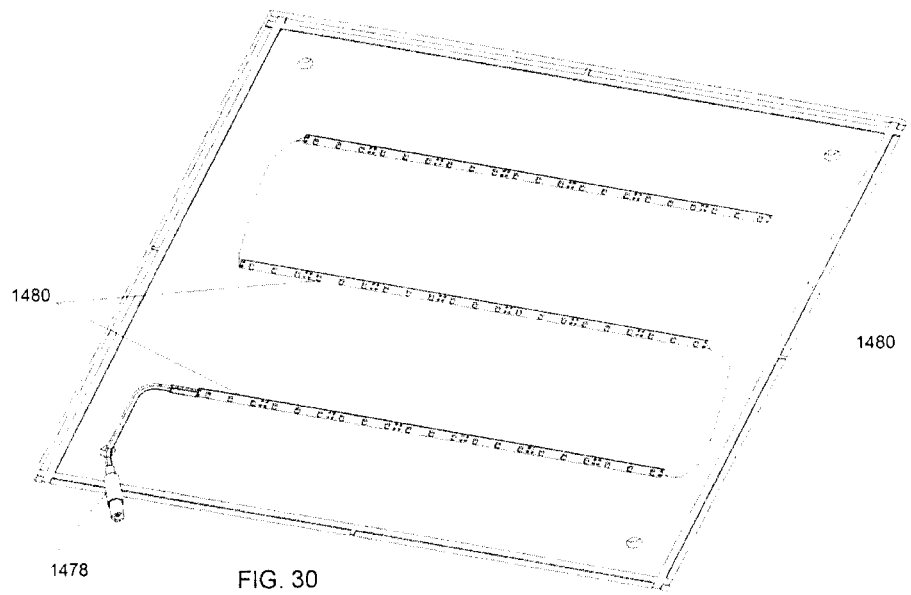
FIG. 30
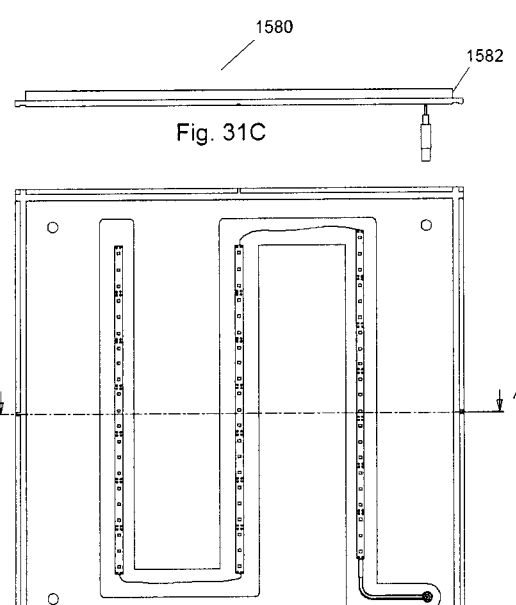
Fig. 31A
Fig. 31B
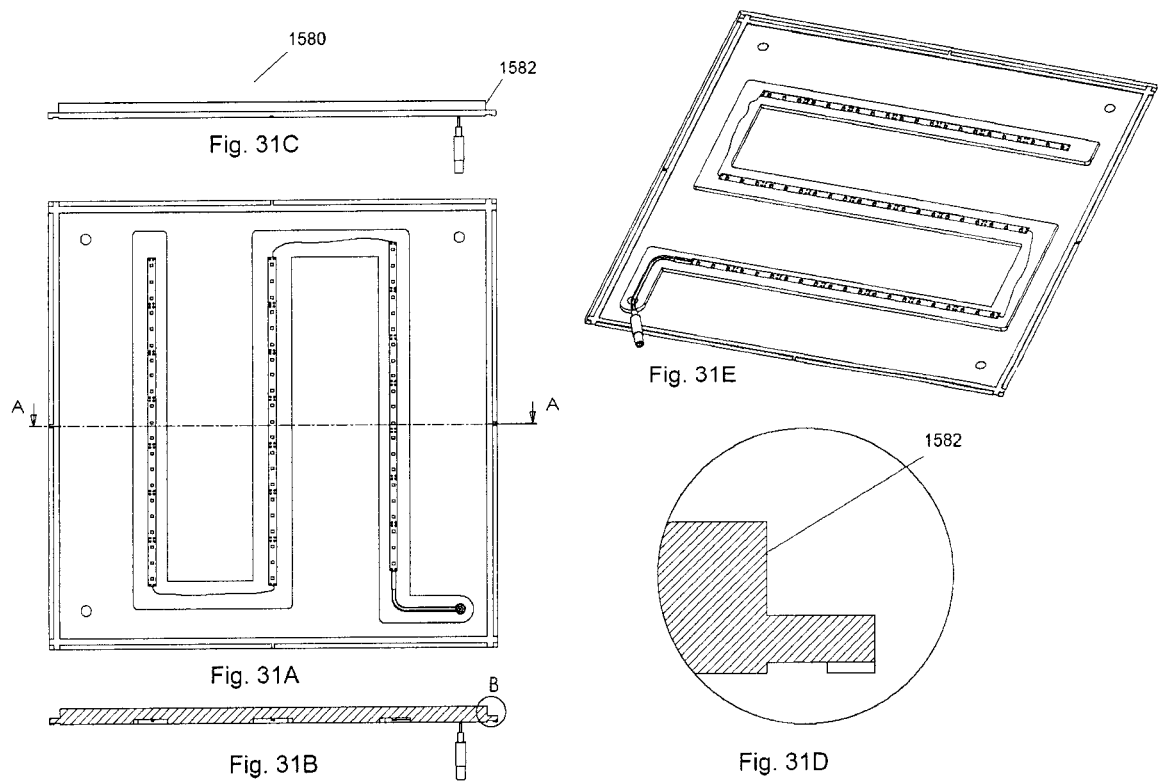
Fig. 31C
Fig. 31E
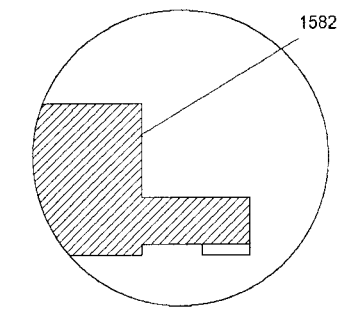
Fig. 31D

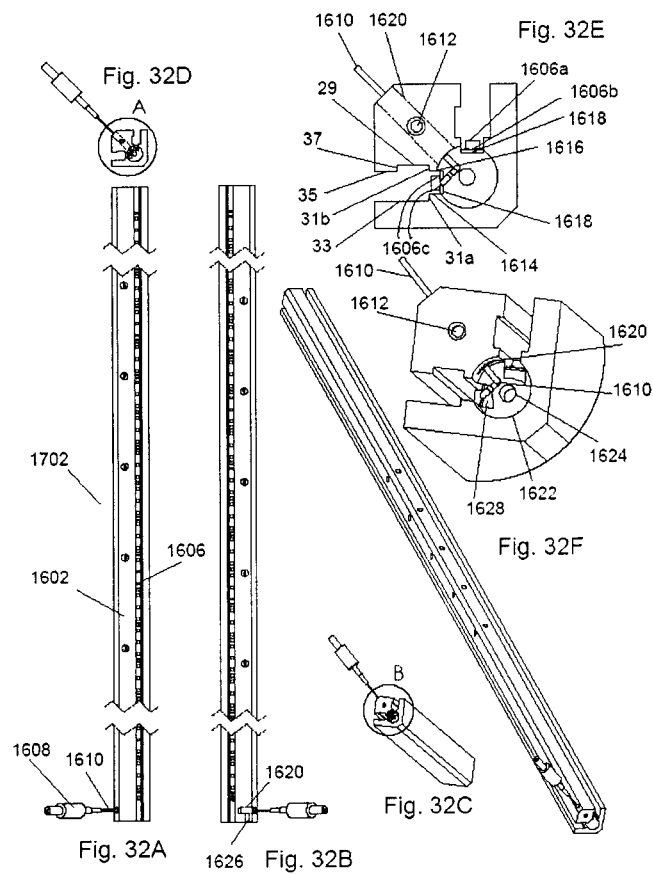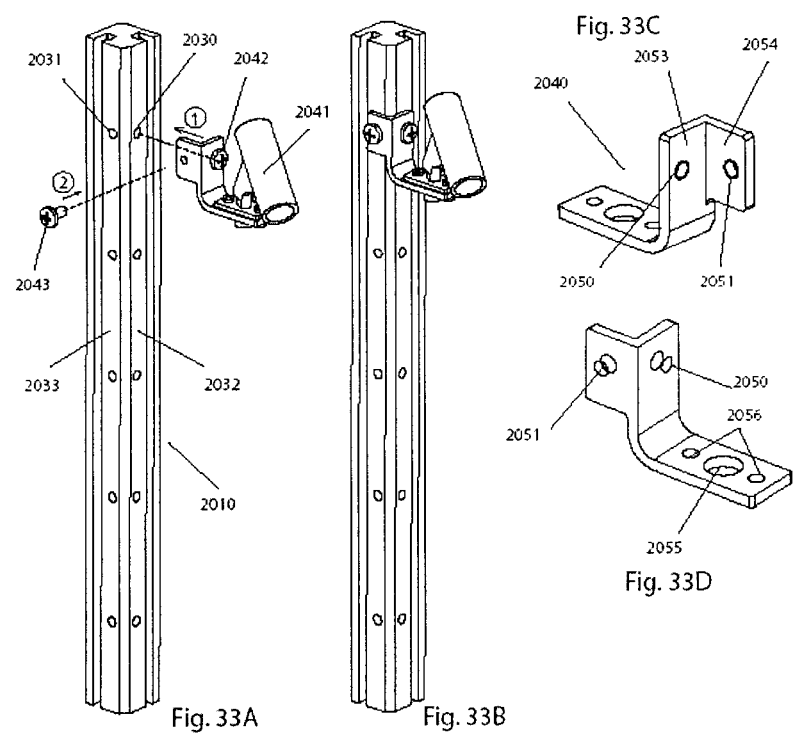

KNOCKDOWN CONTAINERS AND DISPLAYS WITH OPTIONAL LIGHTING FEATURES

FIELD OF THE INVENTION

The present invention relates to containers which can be used in a wide range of applications and industries but, are of interest to those in the display, cabinet, and furniture industries. In particular, the present invention relates to portable displays, cabinets, or furniture for use in applications such as tradeshows, moving museums, retail stores, furniture stores, and the like.

BACKGROUND

In the display industry and in retail stores, many display cases use glass as the main sheet material for the structure. These glass products are very heavy and bulky, and therefore, their cost of shipping is high. In addition, they are highly susceptible to damage and breakage during shipping and handling. Further, they are typically not easily assembled or disassembled, and even if they can be disassembled, they can still be damaged during shipping and handling.

Other displays may use transparent plastic materials. The most common of these types are the displays made from transparent Acrylic. However, the cost of most of the Acrylic displays available in market is very high, and there are few design variation choices. Typically, bonding of plain Acrylic sheets together has been the normal practice for fabrication of the displays that were made from plastic. The downside of using these products is that they cannot be assembled or disassembled, and the material choices are very limited for these products. Further, these Acrylic structures need to get filled internally with some sort of foam to prevent damage to them during shipping. As such, their cost of shipping is very high since they take up a large space. Moreover, if any of their sections get damaged, the whole structure would be scrap since they cannot be easily fixed if their parts get chipped or cracked.

There are other types of display products that are made by injection molding. Injection molded containers do not have the required transparency and quality characteristics that are required in the display industry. Also every size will need a separate mold which increases capital cost and thereby limits the size choices available. In addition, color options and variations of materials and the look of final product will be limited since one cannot use different or combination of materials in one design.

Additionally, most displays and containers that are currently available in market are made from one type of material for all their faces and in most designs the display elements are fixed together and they cannot be disassembled or changed easily. If someone wanted to have a container or display in a polyhedron shape having a 3-dimensional shape with polygon faces such as pyramid or prism shape containers (e.g. a Cube, rectangular Prism, Triangular prism, Hexagonal prism, or any polygon prism) with different types of materials (or different properties) on the faces of the container or display, for various purpose such as advertisement, it would not be easily accomplished using current products.

Further, in many display applications, the display container might be placed against a wall, in a corner or inside a shelf, and therefore, the entire display container does not need to be made from same transparent material (such as Acrylic or Glass) on all faces. If the faces of the display containers are not bonded together, the sheet faces that are not seen can be made from lower cost, lower weight, and more environment friendly materials.

There is a wide range of sheet materials currently available in the market which have very close thickness ranges. However, using different sheet materials in combination for the various faces of a container is not common and has not been easy to accomplish. Examples of these types of sheet materials are material such as, but not limited to, Expanded foam PVC, Acrylic, Polycarbonate, High Density Polyethylene (HDPE), Polypropylene (PP), Medium Density Fibreboard (MDF), High Density Fibreboard (HDF), Glass, and even metal or metal composite materials. These materials can provide a wide range of material property options, and a wide range of texture and color choices. Various materials provide different abilities to print on, and have different transparency and color tints. These sheet materials are also available in the marketplace at very close thickness range (for example thickness of 3 mm to 3.2 mm (⅛ inch) or 6 mm to 6.4 mm (¼ inch) which can be used together in a container design. However, in practice, this approach has not been used to any significant extent.

There have been many containers provided in the prior art that can be rapidly assembled or disassembled. The main types of these "knockdown" containers or displays, typically can be categorized as follow:

I. Some containers are designed to be built from thicker sheet materials (such as wood, Glass, or plastics) that are joined to one another, and which have special design features. These containers weight and cost more than the ones made from thin sheets. Also the choice of materials and/or the combination of different materials, was difficult due to the limitation of thickness of sheet material choices available in market. As a result, these design options would cost and weight too much for display container applications. In addition, most of these designs could not have a closed 6-side or a closed or open polygon design.

II. Some other containers were made of thinner sheet materials but had edges of sheet materials that had to be shaped to special forms. Typically, this could only be accomplished using metallic sheet materials. These designs also could not use a combination of sheet materials having different properties and appearances (for example, the transparency level and range of color choices were not available). In addition, these designs did not have an aesthetic look that would suit display, or the other above-mentioned applications.

III. Some other containers are collapsible containers which are made from cardboard. Their cost in large quantity orders is low, but they have little structural strength and they are sensitive to moisture (e.g. they deform and become week at humid environment). Also, the design and the type of materials used for them is not easily changed. These types of displays and containers are usually only used for one time since they are commonly damaged during use and it is not economical to have them shipped and stored for future use.

IV. Other types of permanent displays and containers are lit so as to ease viewing of their contents. However, many portable displays do not have practical solutions for lighting, power supply and managing wire cables.

Most types of knockdown container designs also require a combination of actions or design features for assembly and/or disassembly, which can have a variety of shortfalls.

These include:
- They need many fasteners or they need a variety of fastening methods and tools
- Their elements are not positioned securely in place in order to prevent movement of their elements due to vibration.
- They do not have an acceptable aesthetic appearance; and
- They cannot be used to create a wide variety of polyhedron-shaped containers by using very similar concept structures and methods.

The knockdown containers and display containers presented herein, eliminate or at least ameliorate many of the shortfalls of the preceding solutions as mentioned above, and provide improved knockdown container and displays, with optionally lighting features, for portable furniture, or for displays such as showcases, display towers, counters, stands, and tables, and the like.

BRIEF SUMMARY OF INVENTION

In one embodiment, the invention features a knockdown container or display that comprises two main structural elements. These structural elements are Sheet elements and Edge elements wherein Sheet elements are joined to one another by use of a Edge, or boundary element, around the Sheet elements, by use of a sliding action. The ease of assembly and disassembly, and the ability to be able to knockdown the entire structure to simple Sheet elements and Edge elements, allows for the creation of numerous portable structures that are structurally strong, and which also easily allows for the interchangeable use of a wide variety of Sheet elements that can be made of a number of different materials with different look and properties.

As such, in a first aspect, the present invention provides a knockdown container or display of the type having a three-dimensional shape wherein said container or display is constructed from two main structural element types comprised of at least one Sheet element; and a plurality of Edge elements, wherein said Sheet element is a sheet material having a polygonal shape having edges, and wherein at least a portion of the edge of each Sheet element defines an essentially planar, and substantially linear sheet edge area, and each of said Edge elements is an essentially linear shaped component having one or more linear slots along their entire length, and said Edge element form a framework wherein both ends of essentially all of said Edge elements are mated to an adjacent Edge element so that essentially all of said Edge elements are prevented from sliding in the direction of said adjacent Edge element, and whereby, essentially all of said Edge elements are secured in place in said framework, and wherein each of said Sheet elements in said container or display is separated by an Edge element to which it is connected, in a sliding engagement, so that the edge of said Sheet element is positioned in, and slid within, the slot in said Edge element, and wherein at least one end of at least one Edge element is a Free-ended and is not mated to any adjacent Edge element so as to allow said Edge element to be slid away from sliding engagement with said Sheet element.

Preferably, the final shape of the assembled display or container will be in the shape of a polyhedron, which is a 3-dimensional container, and having container faces preferably in the shape of a polygon, such as, for example, pyramids and prisms as most familiar shapes. Some common prisms that might be used, are triangle prism, rectangular prism (cube or cuboid), pentagon prism and hexagon prism and the like.

It is to be noted that by indicating that the container or display is generally in the shape of polyhedron, it is meant that the outer boundaries of the container are very close in shape to polyhedron. Similarly, when it is said that the display or container is generally in the shape of polygon, it is meant that the outer boundaries of the faces are close in shape to a polygon.

In the present invention, the outer edge of each Sheet element is the area that will be engaged with Edge elements in some sort of sliding action (that is discussed further in more detail hereinbelow). All of these areas will preferably be in a same plane so that, in other words, distribution of material will preferably be uniform with respect to a plane in all areas close to outer edges of each Sheet element. In areas away from the outer edges of each Sheet element, some protrusions may exist. Also the outer edges of each Sheet element are preferably closed so that the outer boundaries are not open. As mentioned above, this results in the outer boundaries being preferably very close in shape to a polygon.

The outer edge of a Sheet element preferably has a uniform shape along a straight line, in a manner such that it will engage a matching slot in an Edge element in sliding manner. The outer edges of Sheet elements may be continuous, but may include some local interruptions in the form of cutouts (not protrusion). Also some corners of some of the Sheet elements may include cutouts to allow for the passage of sliding Edge elements for other, adjacent Sheet elements, during assembly and disassembly.

The Edge elements are preferably bar shaped components with one or more slots along their entire length. When assembled, the Edge elements created a framework in which framework, the Sheet elements can be positioned. In practice, two possible types of slide joints can be provided between a slot in Edge element and an outer edge of a Sheet element. These are defined as follows:

In the first style of joint, which will be named the "End-to-end sliding joint", the related slot in the Edge element needs to engage with one edge of a Sheet element, in sliding way only from the ends. This means the end of an Edge element needs to be matched in position and orientation, to the end of an outer edge of a Sheet element. Additionally, the direction of the Edge slot and the direction of the longitudinal shape at the edge of the Sheet element are, or are substantially in parallel and aligned, and then the two components will slide together to form a joint. Preferably, the shape of profile of the related slot cutout in Edge element will have undercuts and protrusions that will match closely with the profile of any protrusions and undercuts on the outer edge of the Sheet element in such a way they essentially only allow movement of one with respect to the other only in a sliding manner.

Preferably, at least one sliding engagement for each Edge element is an End-to-end sliding joint, and more preferably, each sliding engagement for all Edge elements is an End-to-end sliding joint.

However, other joints are possible, and in a second style of joint, to be named the "Simple sliding joint", an Edge element and a Sheet element do not necessary require end to end positioning to provide sliding engagement, and an outer edge of a Sheet element can also slide into the slot of the Edge element in a direction at an angle to, or even perpendicular to, the direction of the related Slot, or at an angle to, or even perpendicular to, the related outer edge of the Sheet element.

For this embodiment, at least one of the joints for each Edge element needs to be End-to-end sliding joint. After assembling all Sheet elements and Edge elements in some sort of sliding arrangement, as described above, all of the Sheet elements will be secured in place and none of Sheet elements can move away from the container assembly. To move away, a Sheet element from the container assembly needs to disengage from at least one outer edge of an Edge element, or vice versa. The preferred design of the container and components is therefore such that, in a fully assembled condition, all of the Sheet elements and all of the Edge elements secure one another and preferably only one of the Edge elements will be able to move away from the container assembly. Further, its movement is preferably limited to moving in one direction which is parallel to their longitudinal bar shape direction from one of the ends.

These Edge elements that are moveable after assembly, are termed as the "Free-ended" Edge elements. All of the other Edge elements preferably remain secure in place by Mating one to the other, which means each of their ends will either contact the end or the side of another Edge element or be engaged with a protrusion or recess in another Edge element that prevents the Edge element from moving out of the entire assembly. Preferably, the knockdown container or display includes less than four Edge elements having a Free-ended end and more preferably less than three Free-ended ends are present. Still more preferably, less than two Free-ended ends are present.

During assembly of the knockdown container or display, preferably only one Edge element will have a Free-ended end, and this Edge element will be the last assembled Edge element. As a result, preferably only this last Edge element will be able to move, and it will only be able to move along the direction parallel to its longitudinal direction.

In another most preferred embodiment, the invention features a knockdown container or display that is very similar to the one described above but the Edge elements will restrict the movement of essentially all of the Edge elements. In this embodiment, once all of the Edge elements and Sheet elements are assembled, only one of the Edge elements will be able to move away from the container assembly and its movement will be limited to one direction that is parallel to its longitudinal bar shape direction of one of its ends. In other words, there will be only one Free-ended Edge element, having only one Free-ended end, and this Edge element will be the last Assembled Edge element in the container.

In another embodiment, the invention features a knockdown container or display that has shared Sheet elements or shared Edge elements with other knockdown containers where the first assembled container has all features that are mentioned in either of the previously mentioned embodiments. As a result, instead of having two or more separate containers side by side, a combined structure can be fabricated by using shared Edge elements and Sheet elements. This provides some savings in material consumption and cost.

The above mentioned embodiments will restrict movement of the various comprising elements, and thus, a minimum number of fasteners and tools will be required to assemble and disassemble the entire assemblies. To restrict movement of Free-ended Edge elements and have the last assembled Edge elements fully secured in place, an additional component can be used to fasten the Free-ended Edge element to another Edge element or to an adjacent Sheet element. Preferably this is achieved using some sort of fastener, and preferably, a releasable or temporary fastener such as screw or setscrew. Another option is usage of a temporary locking mechanism that prevents disengagement of Free-ended Edge element from the entire assembly. Examples of the application of this type of temporary locking mechanism will be shown and explained hereinbelow.

In another similar embodiment, the invention features a knockdown container or display where the Free-ended Edge element, or elements, can be secured in place by using a corner element that is secured at a corner with a fastener. A preferred design for this Corner element will be a design that is "snap" fitted at one or more corners of the assembled container while it preferably remains in contact with one or more faces of Edge elements in the corner area. This type of corner element will not need any special tools or fasteners for assembly and disassembly of the knockdown container or display.

The corner element also can be used for securing the end of some of the Edge elements and/or provide some protection at the corner against sharp edges or damages at corner area due to possible impact loads during usage or handling of assembled container.

In another embodiment, the invention features a knockdown container or display where at least some of the Edge elements are manufactured using an extrusion process to provide Edge elements having shapes that essentially match the form for engagement of the edges of the Sheet elements. This type of extruded Edge profiles can be made from one or multiple pieces, using the same or different materials, and wherein multiple pieces can be bonded, adhered, or fastened together.

In addition, the extruded Edge elements can have at least one additional longitudinal groove or hole for the passage of wires, especially for lighting. Also by using a co-extrusion production method, the extruded Edge elements can have some type of rubbery surface, or soft lips for sealing the joints. Finally, Edge elements with additional grooves or holes will allow for the usage of various fasteners in openings at the ends of the extrusion profiles, whenever needed.

In another embodiment, the invention features a knockdown container or display wherein selected Edge elements have slots in such shapes that allow for the incorporation of LED strips, and other similar lighting methods, along their longitudinal slots wherein light can be emitted towards side edges of Sheet elements. This preferred lighting technique is called Edge-Lighting, and this approach is very effective when used with Sheet elements that are made of transparent and some translucent materials. The lighting solutions can additionally comprise portable power supplies providing by batteries, have AC power supply connections, or include devices such as, dimmers, remote controls, or quick disconnects for better control or ease of usage.

In another embodiment, the invention features a knockdown container or display where lighting features such as LED strips are mounted on the Sheet elements or incorporated into the Sheet elements. The lighting solutions can additionally comprise portable power supplies provided by batteries, have AC power supply connections, or include devices such as dimmers, remote controls, or quick disconnects for better control or ease of usage.

In another embodiment, the invention features a knockdown container or display that for each End-to-end sliding joint, the shape of slot in the Edge element is considered to be "L"-shape that extends along the entire length of the Edge element. Then, the edge of the engaging Sheet element has a straight cut and a straight groove that is parallel to, but offset from, the straight outer edge, and this groove extends along entire length of related outer edge. Therefore, the groove in the edge of the Sheet element creates a step that will engage with inner edge of the "L"-shape profile that will allow only sliding engagement from ends.

In another approach, for each Simple sliding joint the shape of the slot in the Edge element is a straight groove that extends along the entire length of the Edge element and the edge of the engaging Sheet element has a straight cut. If the thickness of the Sheet element close to outer edge is more than width of the slot in Edge element a rabbet cut is considered for engaging the edge of the Sheet element. It should be noted though, that each Edge element preferably has at least one End-to-end sliding joint when assembled.

Both of these types of joints are made by a simple manufacturing process and this approach is preferred if small batches are considered. For high volumes of production, the previously discussed extrusion methods can provide additional features.

In another embodiment, the invention features a knockdown container or display wherein all of the outer edges of the Sheet elements, except for one Sheet element, will have an End-to-end sliding joint with engaging Edge elements. This design provides a strong structure for all Sheet elements, with the possible exception of one Sheet element which may not be subjected to excessive force. As an example, a container in shape of prism can be provided, with a top Sheet element that may be used only as a cover in top or lid.

In another embodiment, the invention features a knockdown container or display wherein all of the outer edges of all of the Sheet elements, except for one edge of a Sheet element, will have an End-to-end sliding joint with engaging Edge elements. This design in some application facilitates assembly of the Sheet elements by having only one Simple sliding joint at one outer edge. This can be done without any major effect on the strength and integrity of the entire assembly.

In another embodiment, the invention features a knockdown container or display wherein each slot in each Edge element engages with an edge of a Sheet element with End-to-end sliding joint. This embodiment creates the strongest joint condition. If the design does not include one or more Sheet elements it is considered to be a Strong Open container and if the design includes Sheet elements for all faces of a related 3-dimensional container, it is considered to be Strong Closed container.

As specific design for the above-mentioned embodiment, the invention features a knockdown container or display that is in shape of prism, with a polygon shaped Sheet element on either the top or bottom, or on both the top and bottom, and rectangular shaped Sheet elements on all sides, and each slot in each Edge element engages with an edge of a Sheet element with End-to-end sliding joint. If the container has a polygon shaped Sheet element on the top only, with no Sheet element on the bottom, it will be a Strong Open design. Similarly, if the container has a polygon Sheet element only on bottom, with no sheet element on top, it will also provide a Strong Open design as well. However, if the container has polygon shaped Sheet element on both the top and bottom, it will be considered to be a Strong Closed design.

In another embodiment, the invention features a Strong Closed knockdown container or display in the shape of prism, which also provide shelving considerations by placing one or more holes on the inner faces of selected Edge elements. These holes on the Edge elements face towards inside of the container, and allow for the installation of shelving supports and/or Shelves and/or divider elements, for efficient usage of the inner space of the container. Also, some of the unused inner holes for shelving can also be used for quick mounting of other devices, including, for example, Spotlights and the like. It should be noted that Shelves and dividers, and the like, inside of the container, are not typically considered one of main structural Sheet elements, although this option is not excluded.

In another embodiment, the invention features a knockdown container or display that is supported by a base, a base that has wheels, a revolving base, or by a combination of base, wheels, and/or a revolving base for ease of movement and positioning, and for ease of access to the contents in the container or display, in its assembled condition.

As a specific embodiment, the invention features a knockdown container or display that is in shape of Cuboid prism or Rectangular-prism and has a Strong Closed design and the shape of the slot in all of the Edge elements is considered to be "L"-shape, and wherein the slot extends along the entire length of each Edge element. In addition, the edge of all Sheet elements has a straight cut, and has a straight groove that is parallel and offset from the related straight outer edge for each side. This groove extends along the entire length of the related outer edge, and all of the joints between the Edge elements and the edge of Sheet elements are End-to-end sliding joints.

As another group of specific embodiments, the invention features a knockdown container or display that is in shape of Triangle prism, or Pentagon-prism, or Hexagon prism, or octagon prism and has a Strong Closed design and the shape of slot in all Edge elements is considered to be "L"-shape, and wherein the slot extends along the entire length of each Edge element. In addition, the edge of all Sheet elements has a straight cut along with a straight groove that is parallel and offset from related straight outer edge for each side. This groove extends along the entire length of the related outer edge, and all of the joints between the Edge elements and the edge of Sheet elements are End-to-end sliding joints.

The present invention also provides a method for the production of a knockdown container or display of the type described herein. As such, in a further aspect, the present invention also provides a method for the production of a three-dimensional knockdown container or display, wherein said method comprises providing at least one Sheet element, and a plurality of Edge elements, wherein said Sheet element is a sheet material having a polygonal shape having edges, and wherein at least a portion of the edge of each Sheet element defines an essentially planar, and substantially linear sheet edge area, and each of said Edge elements is an essentially linear shaped component having one or more linear slots along their entire length, wherein each edge of said Sheet element is sliding engaged with said linear slot in said Edge element so that the edges of said Sheet element are positioned in, and slid within, the slot in said Edge element, sliding engaging a further Sheet element with a second slot in said Edge element and placing further Edge elements around the edges of said further Sheet element;

repeating this last step until each of said Sheet elements in said container or display is separated by an Edge element to which it is connected, in a sliding engagement, and said Edge elements form a framework wherein both ends of essentially all of said Edge elements are mated to an adjacent Edge element so that essentially all of said Edge elements are prevented from sliding in the direction of said adjacent Edge element, and whereby, essentially all of said Edge elements are secured in place in said framework, and wherein at least one Edge element has a Free-ended which is not mated to any adjacent Edge element so as to allow said Edge element to be slid away from sliding engagement with said Sheet element.

More Detailed Info:

Structural Elements:

Sheet elements are preferably made from wide range of thin sheet form materials that are commonly available in market. The thickness of the selected sheet materials for these containers depends on size of the product, its design structure, and the load condition that they will be exposed to during an application. Sample materials for use as the sheet raw materials include, but are not limited to, Plastic materials (such as Polypropylene, Polyethylene, Acrylic, Polycarbonate, PVC, expanded foams), wood base products (including MDF, HDF, plywood, Green-Core), Glass, or even thin metallic sheets (made of, for example, Aluminum or steel). These sheets are cut to their proper sizes from a supplied blank size, and are processed as required to make the "Sheet elements". Sheet elements preferably have a special shape close to their edges that will match the profile in Edge elements in order to provide for a sliding fit. Many shapes/forms may be used to accomplish the sliding fit, but a simple design option is making straight grooves close to outer edges of these sheets on only one face of the sheet. This will make manufacturing the Sheet elements easier, more accurate, and faster, particularly, if the Sheet elements are made by a Routing or milling process. Also Sheet elements can also be manufactured by injection molding, and the like, for some material options, if a specific size is high in demand. Although Sheet elements can be thin, light and economic, the final assembled structure will be very strong due to special three dimensional orientations of elements and joints with respect to one another.

The edges of the Sheet elements are preferably continuous, but the use of cutouts along at least part of the edge of the Sheet element is not excluded. The Sheet element itself is also preferably substantially planar in nature, but it can include protrusions and the like, if desired. The Sheet element can also include holes or openings, if desired.

Edge elements are usually made from Edge profiles that are prepared from a wide range of materials such as wood-based materials (including hardwood, softwood, plywood strips, and the like), Plastics (such as Extruded profiles of PP, PE, polymethyl methacrylate (PMMA), polycarbonate (PC), or composite wood), or Metals (including, Aluminum, Brass, Steel and the like). Also co-extrusion of plastic materials can be used for manufacturing the Edge elements in order to add more features to the assembly, including, for example, sealants, wire paths, etc.

Preferably, Edge elements are used that have "L"-shape slots along entire length of Edge elements, and provide strong slide joints with the above-mentioned Sheet elements (e.g. the ones with simple grooves offset from their edges). This combination of elements allows for the creation of a new series of containers which provide a superior and unique combination of features.

Some Edge elements may have side holes on their inner faces, at certain spacing intervals, for mounting shelving supports. The shape of these holes can be varied to any suitable shape, but typically, the most common shape of holes that will be used, are round shaped holes. To distribute the loads on the shelving more effectively, side holes may be added to the inner side of the Edge elements in same plane at certain intervals, one hole on each inner face. The position of shelving holes on all selected side Edge elements will thereby be provided at the same elevation in order to allow for a uniform support of the Shelf Sheet elements. Shelf pins or other supports can be placed into the shelf holes in the Edge elements, to provide support for the shelves.

Container and Display Applications and Benefits:

The final assembly of the display or container assemblies of the present invention has an pleasant aesthetic look that suits display and tradeshow industry the most. However, skilled artisan would be aware that the products of the present invention can also be used in a wide range of other applications, including, for example, but not limited to, their use in the manufacture of furniture, cabinets, organizing containers, packaging containers, decorative containers for around the home or the office, pet container for some pets or animals in the home, toy containers, shipping containers, ballot and collection boxes, gift containers, and small buildings and the like, such as sheds. Also the combination of several container or display structures can also be considered for use.

It should be note that the user can easily change the Sheet elements to suit a variety of different applications, designs, or tastes. Sheet elements of the container may get changed for one or combination of following reasons:

Different material properties

Different color on selected faces

Different transparency on selected faces and views

Different texture or printing on selected faces specially for marketing advertisement Changing the design of container for different application (Ex: Changing the opening type, adding a door, or eliminating an access door)

Additionally, if any section or element gets damaged by an accident, that section or element can be replaced easily with minimal cost, and there is no need to replace the whole unit.

Lighting Features:

One of important application of the above mentioned embodiments, is in the display industry and lighting is an important aspect of displays. Several lighting solutions can be considered in order to satisfy the different applications. Some lighting features are incorporated into the Sheet elements, some lighting features are incorporated into the Edge elements, and some additional spot lighting designs can also be considered. Other lighting aspects, such as adjustment of lighting position and direction, intensity adjustment, wiring arrangements, and providing a suitable, preferably portable, power supply can also be considered.

a) Edge Elements with Source of Lighting:

To light up the transparent and partially translucent Sheet elements with a compact source of light, Edge-lighting is very effective method. As previously described, Edge profile embodiments can be fabricated with special slots that provide lighting from the edge of Sheet elements, and which can be used in the previously discussed structural designs of containers and displays. For example the Sheet elements that are made from Acrylic (clear or tinted) can be used in combination with Edge elements that include an incorporated source of light (for example LED lights). The lighting from the edges will provide a lighted glow for any texture or engraving made on the inner or outer surface of clear or tinted Sheet element.

For clarity, it should be noted that the inner face of the sheet element is the face that is towards inside of display or container assembly. The outer face of the sheet element is the face that is viewed from outside of the display or container assembly.

Another common application for using these Edge elements with lighting is lighting up any printing that is made on the outer face of Sheet element, or lighting up any decals that are mounted on the outer face of Sheet elements. To make the design more effective, special textures can be added to inner face of Sheet elements to distribute the light evenly on the entire viewing face. For the most efficient result, and in order to have an even distribution of light, several Edge elements may include incorporated LED lights.

b) Sheet Elements with Source of Lighting:

To light up the content of display from an especial direction, the sheet elements that are facing that direction may have source of lights mounted or incorporated on them. For example, LED strips may be mounted or incorporated onto the surface of any Sheet elements. Also for transparent or translucent Sheet elements a separate lighting plate may be used to light up an area in a selected direction.

c) Adjustable Spotlights Mounted on Edge Elements:

Spotlights, or the like, can be mounted inside of the container or display using any suitable means. Preferably, however, the base of any spotlights includes a design that allows the spotlight to be mounted or removed easily on the selected Edge elements that are provided with mounting holes. For example, in display assemblies that have shelf holes with two holes in the same plane on the inner faces of the Edge elements, at certain intervals, if the inner faces are at right angles or at a larger angle than 90 degrees with respect to each other, the shelving holes may be used for mounting the base of spotlights. Since usually extra shelving holes are usually provided, the position of spotlights can be adjusted easily. If a display does not have shelves, similar shelving holes can still be considered on selected Edge elements for mounting the base of spotlights. Preferably, at least one pair of holes on two inner faces of Edge elements, that are in same plane (a plane perpendicular to axis of Edge element profile), are provided so as to consider mounting the base of spotlight. The Edge element with holes for supporting the spotlights can be in vertical or horizontal position. Correspondingly, the base of the spotlight preferably has two flat sides that match the angle between the inner sides of the selected Edge element, and one hole is a tapped hole for inserting a screw into the tap hole. Preferably, there will be a protrusion, pin, or a secured screw on the other side of the spotlight base. For mounting the base of the spotlight on the Edge element, the user positions the base of spotlight with face that has the pin or protrusion parallel to inner face of the Edge element which has the matching hole. The user then slides the protrusion or pin into the matching hole in Edge element and then screws in the screw on other side of the base to engage with the matching hole on the other inner face of the Edge element. The hole and protrusion will preferably have a slide fit relationship, and the screw also will have a generally slide fit relationship into the hole on other side. While not essential, having the pin or protrusion and tapped screw in two different planes better secures the spotlight base in place with respect to Edge element.

BRIEF DESCRIPTION OF DRAWINGS

The forgoing and other features and advantages of the disclosure will be apparent from the following description of the disclosure as illustrated in the accompanying drawings. The accompanying drawings, which are incorporated herein and form a part of the specification, further serve to explain the principles of the disclosure and to enable a person skilled in the pertinent art to make and use the disclosure. Identical numbers are used to describe the same features in the drawings, and it should be noted that the drawings may not be to scale.

In the drawings:

FIG. 1A and FIG. 1B show views of a Cuboid Prism container in a fully assembled condition;

FIG. 1C shows a Cross section of a preferred engagement of two Sheet elements with an Edge element;

FIG. 1D shows a Cross section of a securing last assembled Edge element;

FIG. 2A shows a preferred shape of the engagement slots in an Edge profile for use in a Cuboid prism container;

FIG. 2B shows an Edge profile with single slot and sample bevel cut at the ends;

FIG. 3A shows a preferred embodiment of a Sheet element for use on the top or bottom of a Cuboid Prism container;

FIG. 3B is a closer view of a part of FIG. 3A that shows the edge of a Sheet element along with straight grooves offset;

FIG. 3C is a closer view of the small grooves of FIG. 3A;

FIG. 3D & FIG. 3E show sample embodiments of one side of a Sheet element, and an enlargement, with an opening for a Cuboid Prism container;

FIG. 4A to FIG. 4M show a sample assembly process for a Cuboid prism that is similar to the embodiment shown in FIG. 1;

FIG. 5A to FIG. 5C show views of a fully assembled container in shape of Cuboid prism;

FIG. 6A & FIG. 6B show an alternative Edge profile embodiment with one End-to-end sliding joint and one Simple sliding joint;

FIG. 7A to FIG. 7C show a sample of an alternative profile design for the Edge element and an alternate design for a matching Sheet element;

FIG. 12A to FIG. 12E show another method for securing the last assembled Edge element in place, protecting the corners, and preventing slippage of the entire container or display;

FIG. 13A & FIG. 13B show a Hexagon Sheet Element for the bottom of a Hexagon prism, with an enlarged view;

FIG. 16A to FIG. 16C shows the assembly of the Side Edge elements for Hexagon prism;

FIG. 17 shows the Strong Open embodiment of a Hexagonal prism container;

FIG. 18 shows the Strong Closed embodiment of a Hexagonal prism container;

FIG. 23A & FIG. 23B show one sample design for locking of the last assembled Edge element;

FIG. 24A and FIG. 24B shows a sample of end cap design;

FIG. 25A to FIG. 25C show a Shelf support that can be assembled onto an Edge element;

FIG. 26A shows a sample design of an Edge element with round end-holes;

FIG. 26B shows a sample design of Edge element with an additional groove for the passage of wires;

FIG. 27A to FIG. 27F show alternative samples of Extrusion Profiles or Roll-formed edges in an Edge element;

FIG. 28 shows an Edge Profile that is made by joining two profiles;

FIG. 29A to FIG. 29D shows an Exploded perspective view of a display, and detailed views of the various assemblies used to make a sample display with lighting;

FIG. 29E & FIG. 29F shows views of a Fully assembled display comprising two Cuboid containers;

FIG. 30 shows a perspective view of a Sheet element with lighting option;

FIG. 31A to FIG. 31E show views of another embodiment of a Sheet element with lighting;

FIG. 32A to FIG. 32F shows views of a sample Edge element assembly with LED lighting inside grooves of Edge element;

FIG. 33A to FIG. 33D shows views of an adjustable spotlight that can be mounted into two holes on inner faces of an Edge element; and FIG. 34A &

DETAILED DESCRIPTION OF EMBODIMENTS

Figure 8:
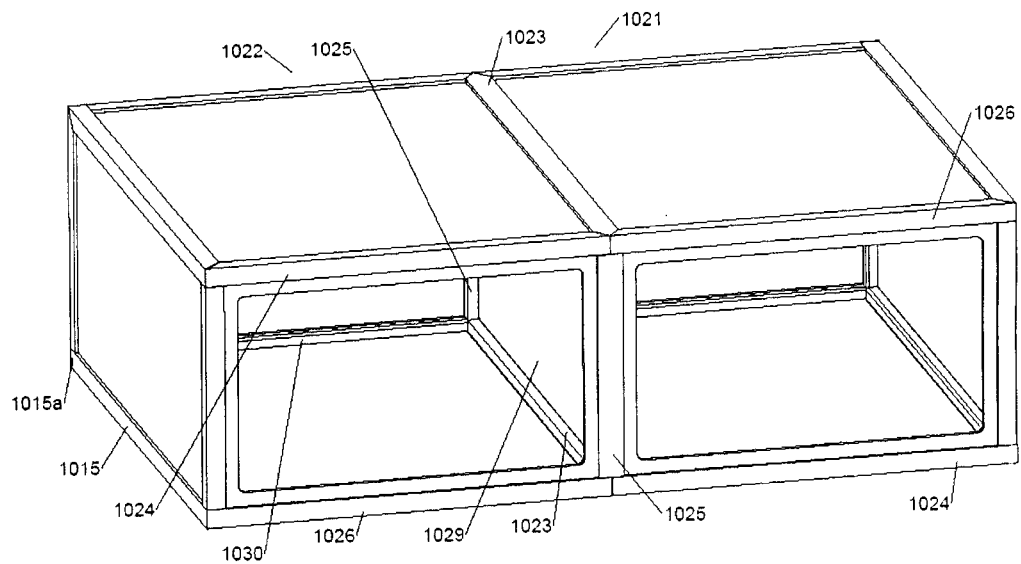
FIG. 8 shows an additional generalized concept of the invention wherein two (or more) containers are joined and have shared Edge and Sheet elements.

While specific configurations and arrangements are discussed, it should be understood that this is done for illustrative purpose only. A person skilled in relevant art will recognize that other configurations and arrangements can be used without departing from the scope of the present disclosure. The scale of some drawings and figures was changed to fit the document.

FIG. 1A and FIG. 1B show the assembled structure of a Cuboid Prism container 2000, fabricated in accordance with the present invention, in a fully assembled condition. The main structural elements shown in the figures are:

Sheet elements: Items 2001, 2006, 2007, 2008, 2009, and 2014;

Edge elements: Items 2002 (×2), 2003 (×2), 2004, 2005, 2010 (×3), 2011, 2013, and 2015

Item 2001 as referred to as a bottom Sheet element. Top Sheet element is item 2014. The last assembling Edge element is item 2015 which is the only Free-ended Edge element. Sheet element 2008 has a large opening in its center that is covered with a door element 2018 which is attached to sheet element 2008 with hinge elements 2019. This door has a locking mechanism 2020. Shown design has a pivoting lock mechanism with a tongue that can engages with inner area of edges of Sheet element 2008 at locked position or can engage with an insert mounted locally in inner face of Sheet element 2008.

End cap 2017 is mounted to the open end of last assembling Edge element 2015. FIG. 1C shows a detailed sectional view A-A in FIG. 1A at preferred engagement conditions between the edges of the Sheet elements (shown Sheet elements 2007 and 2014) with the Edge elements (shown as 2002 on Top face). FIG. 1D shows section view B-B in FIG. 1A as a preferred securing method for assembly of the last assembled Edge element 2015 that is Free-ended. To secure item 2015 in place a screw 2016 is placed into a hole that will align with the undercut 21 (as shown in FIG. 3) in top Sheet element 2014. When screw 2016 is tightened all the way down, the Edge element 2015 cannot be disassembled. By loosening screw 2016, the Edge element 2015 will be allowed to slide out and it will be possible to disassemble the entire container assembly by sliding out the elements one after another. In a preferred feature, to access screw 2016 a user would need to attain access to the inside of the container by unlocking element 2020. Therefore, the entire assembly is secure when the door is locked.

End cap 2017 is a decorative covering at the end of last assembled Edge element (Free-ended Edge element). The end cap can be a veneer product or a cap similar to item 47 shown in FIGS. 24A and 24B, and preferably is designed to match the style of the Edge profile and slots. End-caps 2017 will prevent dust and other materials getting into the slots of profiles. In addition, the product will look better. Considering the precise dimensions of the slot profile 27 for Edge element as shown FIG. 2, proper protrusions 49 (see FIG. 24A) can be designed in the End-Cap element to have light press fit between the protrusions 49 of the End-Cap element and the open end of profile 27 of the Edge element. Rounding the front edges of protrusion 49 makes assembling easier. End-Cap 2017 can be made from plastic by Injection Molding and small draft angle (FIGS. 24A and 24B), at insides 51 and at outside 53 of protrusion 49 which will help ejection of the part during production and also allow ease of fit and assembly into opening profile 27 of Edge element 2017. Round edges 55 may be considered for decorative purpose.

FIG. 2A shows sample of an Edge element 11 for longitudinal sliding of Edge element into the grooves around outer edges of two Sheet elements. The profile of Edge element 11 has two "L"-Shape slots 27 along two perpendicular sides of it that allows sliding of Edge element along edges of two perpendicular Sheet elements at the same time. Slot 27 is defined by faces 29, 31, 33, 35, and 37 and may include small fillets at intersections as well. Slots can be at an angle if the engaging Sheet elements are also at an angle as will be shown in other Polygon prism designs in FIG. 16B and FIG. 16C. Shown "L"-Shape slots 27 in FIG. 2A will prevent movement of Sheet-elements with respect to Edge elements in two perpendicular directions and it will only allow relative movement only in sliding directions. Chamfers 1301 and 1301a are provided to avoid sharp corners and provide clearance during assembly but they do not have any functional role that could affect the structure of container. After proper assembly of the main structural elements, the Edge elements are secured in place by contact with one another; which will be termed as "Mating" with each other. In most Mating cases, a square cut or a bevel cut at one or both ends of an Edge element will contact a side or end of another Edge element. There are other Mating conditions that allow part of an Edge element, or extension of it, to fit into or contact another Edge element and have it secured in place. For the embodiment shown in FIG. 1A & FIG. 1B, only for last assembled Edge element 2015 (the Free ended Edge element), is another component, such as locking screw 2016, that is placed into counter-bored hole 39, required. As mentioned before, all other structural elements, namely the Sheet elements, and Edge elements, are secured and mated one to another, during assembly. Therefore, a minimum number of fasteners will be required during assembly and disassembly. It should be noted that the position of hole 39 will match the position of one of small grooves 21 in the top Sheet element. Inside, the hole can be tapped, used a threaded insert, or can be just a hole for using a self threading screw. For Edge profiles made of wood, the profile of the Edge elements can be machined by using proper cutter tools (in Moulding machines or a milling machine), and for plastic & Aluminum, the Edge-elements can be made more economically by extrusion process.

In FIG. 1A, as an example, the square cut of the end creates a face 41 (FIG. 2A) that can mate with another Edge element. FIG. 2B shows sample of an Edge element with single slot that has a bevel cut at the ends. As another example face 41a can mate with end of another Edge element also having a bevel cut.

It should be noted that the Edge element shown in FIG. 2B with a single Slot will be used for Open designs in which one face of the container does not have a Sheet element. In this case, Mating the Edge elements at open side of the container makes the structure stronger.

FIG. 3A shows a preferred design of Sheet element for use as a top of Cuboid prism container 2000. In this design, the sheet element has straight grooves 19 on one face of the sheet that are offset from the outer edge and the bottom of grooves have very small or no radius at their root. This Grooving creates a strong sliding joint with matching "L"-shape slots in the Edge elements that feature an End-to-end sliding joint. To engage the edge of Sheet element and "L"-shape slot of Edge element, the two parts need to be engaged from their ends.

FIG. 3C shows a closer view of the grooves of FIG. 3A, and FIG. 3B shows a view of the short grooves 21 of FIG. 3A for engagement with setscrew or screw 2016 shown in FIG. 1D, which setscrew or screw is used for locking the last assembled Edge element with only one degree of freedom. Four short grooves are shown on Sheet element in FIG. 3A to foolproof the design and allow locking of the last Edge element 2015 in either orientation of assembly of the square shape Sheet element 2014. Only one of the short grooves 21 will be actually engaging with screw 2016.

The design of Sheet element 2001 on the bottom of Cuboid Prism container 2000 is very similar to the top sheet but the bottom Sheet element does not need any short grooves 21 as no Edge element is used around it that requires locking with additional elements (such as screw or setscrew) in the design shown.

FIG. 3D & FIG. 3E show side Sheet element 2008 with grooves 19 close to all outer edges and corner cutouts 120 on all corners. Sheet element 2008 shown on its side has an opening access with edges 423 all around and additionally includes sample holes, shown as h1, for mounting a hinge, when needed. Other side sheet elements 2006, 2007, and 2009 are very similar without any opening or holes for hinges.

FIG. 4A to FIG. 4M show a preferred assembly process and examples of end condition for all shown Edge elements. Starting with FIG. 4A, the process shows a sample assembly strategy by starting the assembly with bottom Sheet element 2001 and then partially sliding all Edge elements 2002, 2003, 2004 and 2005 to the position shown in FIG. 4B. Thereafter, the user slides side Sheet elements 2006 and 2009 to the position shown in FIG. 4C and then adding the remaining side Sheet elements to create the assembly shown in FIG. 4D. Sheet element 2008 has an opening in middle and door, hinges, and lock are preassembled to Sheet element 2008 before addition to the container.

Then the user will push all of the bottom Edge elements inwards, in sequence, to mate one to another, and form the assembly shown in FIG. 4E. At this stage both ends of Edge elements 2002 and 2003 have bevel cut (in this example 45 degrees), and they mate with the other edge elements at their end. One end of Edge element 2004 has bevel cut and the other end has square cut. The end with bevel cut mates with bevel end of Edge 2002. The end with Square cut mates with side of Edge element 2005. Edge element 2005 has bevel cuts at the end in two different planes. One end mates with one end of Edge element 2003; The other end mates with a bevel cut in Edge element 2011, which is described later. In FIG. 4F all shelf supports 2021, if desired are added, and then all four vertical Edge elements 2010 and 2011 slide in and they join all side Sheet elements. FIG. 4G and FIG. 4H show different views of the assembly up to this stage. FIG. 4I shows a detailed view of the assembly where the bevel ends of two Edge elements 2005 and 2011 mate. Now shelves 2012 can be added to the assembly and they can rest on Shelf supports 2021. It should be noted that Shelves, shelf supports, door, hinges, and lock are not considered Main structural elements for the container and they are optional elements that are shown as example here.

Then as shown in FIG. 4K Edge element 2013 is joined by sliding to upper Edge of one of side Sheet element, here shown upper edge of Sheet element 2006 as example. Top Sheet element 2014 is then joined into other slot of Edge element 2013 by sliding from its end. Then as shown in FIG. 4L the other Edge elements 2002 and 2003 are added to the assembly to join the other edges of Sheet element 2014 with other top edges of the side Sheet elements.

Finally, Edge element 2015 is added as last assembled Edge element; this element has a bevel cut at one end and Square cut at the other end. One end of Edge element 2013 has a Bevel cut and the other end has a square cut that will mate with side of Edge element 2015. Ends of Edge element 2003 and 2002 on top and bevel end of Edge element 2013 will mate one another at the bevel ends. It will be noted that only one end of Edge element 2015 is not mated with any other Edge element; here the end with square cut. Therefore, Edge element 2015 is the last assembled Edge element and it is the only Edge element that is Free-ended. To secure this Edge element in place properly, one option is using screw 2016 as shown in FIG. 4M and securing the Edge element 2015 in place as shown before in FIG. 1D. The shown assembly is very similar to the container or display shown in FIG. 1; only door and method of hinging is slightly different and it refers to another style of door that is in same plane with Sheet element 2008.

It can be noted that the assembly process may be altered in sequence for some elements without affecting the integrity of the entire assembly. The position of some elements may also be changed, if needed. For example if the user wanted to have the hinges of doors on left side and lock on right one may simply flip the sheet element 2008 and its attachments. In another example, if the user wanted to have the last assembled edge element in another direction, the assembly position of top four Edge elements could be rotated.

In any case, the key feature of the shown embodiment is that all structural elements slide to one another and they lock or restrict one another without the need for any fastener, and that only one Edge element (which is last assembling edge element 2015), will be needed as the Free-ended Edge element.

Locking the last Edge element in place is not absolutely required, but if the user wishes to have the maximum rigidity for the entire assembly and/or wanted security for content of container, the last Edge element is locked into position with a fastener. There are many possible ways to secure the last assembled Edge element but the design previously shown (namely screw 2016 on Edge element 2015 that engages Edge of undercut 21 in Sheet element 2014) is a preferred method. After use, by using the screw, the Edge element 2015 becomes unlocked and the entire container can get disassembled.

Different views of the fully assembled container or display is shown in FIG. 5A and FIG. 5B, and FIG. 5C shows the free end of Edge element 2015. In summary, the design shown in FIG. 1A, FIG. 1B, FIG. 5A, and FIG. 5B represents a most preferred embodiment of the present invention, with only one Free-ended Edge element where only this element is not Mating with any other Edge element (again, where Mating means each of ends of Edge element will either contact with end or side of another Edge element or part of an Edge element get engaged with a protrusion or recess in another Edge element in such way that prevents the Edge element from moving out of the entire assembly unless another Main structural element, such as Sheet element or Edge element to be taken out). In addition, in this embodiment, all Edge elements had two "L"-shape slots and all joints between Edge elements and Sheet elements were End-to-end sliding joint which means every joint need positioning ends aligned with and parallel at the ends, and then assembled by sliding one part to the other one or other ones, if engaging two main elements at the same time. This structural design and joint style provides a strong structure.

FIGS. 6A and 6B, shows an alternative design of an Edge element 309b that can engage two Sheet elements with less strength in the final assembly. In this design the Edge element 309b will be engaged from the side with slotted profile 27 with edge of a Sheet element with a matching grooving which will create an End-to-end sliding joint in direction D2. Therefore, the Edge element will be allowed to slide only in direction of its main profile with respect to the Sheet element inside slot 27. The other slot in Edge element is 27b is a simple groove that allows engagement of a Sheet element 304b without grooving and with less restriction. In other words, shown Sheet element 304b can also slide into the slot 27b of Edge element 309b in direction D1 that is at an angle (e.g. perpendicular in the shown case), to the longitudinal direction of slot 27b. This creates a Simple sliding joint. The design 309b of Edge element can be used in various locations in the container, if less stiffness of the container is acceptable. However, the more this Edge element design is used, the weaker (less stiff and rigid) the structure is, in comparison to the design shown in FIG. 1C and FIG. 1D.

FIG. 7 shows still another example of an alternative profile design for the Edge elements and a corresponding alternate design for the matching Sheet element to provide an alternate sliding engagement option for an End-to-end sliding joint. In this approach, a rounded sheet edge is fitted into a round hole on the Edge element. FIG. 8 shows a generalized concept for the fabrication of a structure for a container or display having two containers 1021 and 1022 that are joined and have shared Edge and Sheet elements. It should be noted that this approach can be used to provide an assembly comprised of several joined containers.

In the shown design, the last assembled Edge element (or Free-ended Edge element) in container 1021 is preferably secured in place by another Edge element in container 1022 (or it can be secured by another locking component (screw, setscrew, corner part, or a lock), as described hereinabove). Therefore, the final assembly can also be designed in such a way that last assembling Edge element 1015 will be the only Edge element that is Free-ended and it can get secured by another component (screw, setscrew, corner part, or a lock). Here screw 1015a is shown as final securing extra component that fastens the end side of Edge element 1015 to the end face of Edge element 1030.

Figure 9:
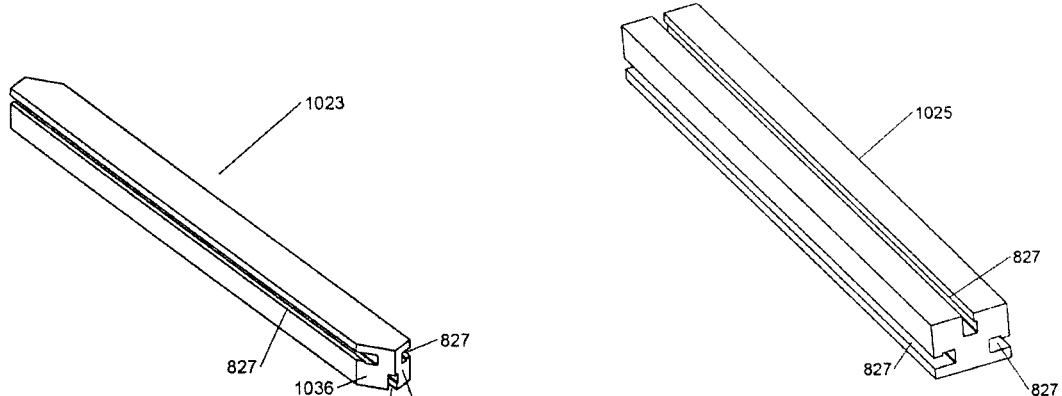
FIG. 9 & FIG. 10 show samples of Edge elements and profiles wherein two containers are joined and have shared elements.
Figure 10:
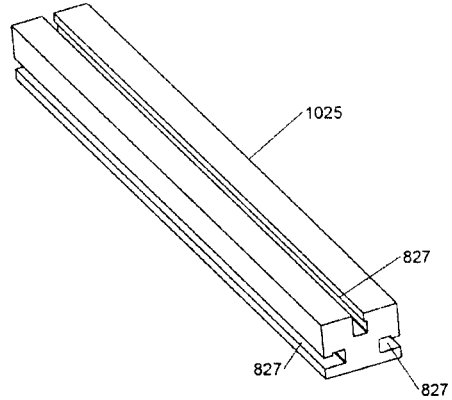

Both of joint containers or displays 1021 & 1022 are designed with a large opening in one of side Sheet elements. The two containers 1021 & 1022 also include a shared Sheet element 1029. The Edge elements 1023 & 1025 surrounding the shared Sheet element 1029 need to have additional slot as shown in FIG. 9. The angle of cuts at two ends of Edge elements 1024 and 1026 may be different. For example one end is 45 degrees and the other end is 54.7 degrees for the shown design which will mate faces 1036 in Edge element 1023. Edge elements 1023 and 1025 in FIG. 10 have slots 827 that are similar to slots 27 in FIG. 2.

Figure 11:
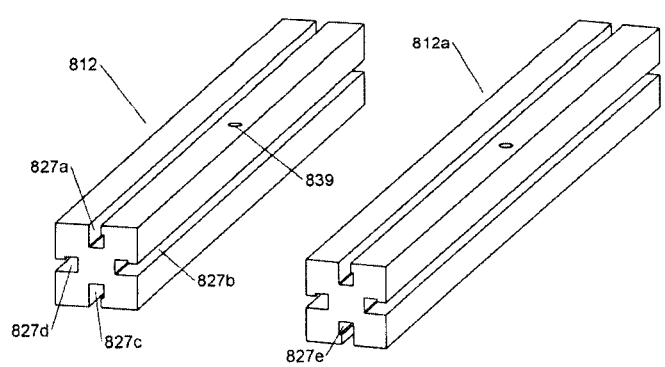
FIG. 11 shows samples of Edge elements and profiles when three or more containers are joined and have shared elements.

A variety of containers can get joined together in very similar manner in 3-dimensional space and FIG. 11 shows samples of Edge profiles 812 and 812a when three containers intersect. Slots 827a, 827b, 827c, and 827d in Edge profile 812 show one arrangement and in Edge profile 812a the slot 827e is another possible arrangement. Hole 839 is shown as an example where the item is used for supporting a shelf.

FIG. 12A to FIG. 12C show another possible method for securing the last assembled Edge element 70 in place. In this design, element 70 is the only Free-ended Edge element in this embodiment. This method shows usage of a snapping element 71 at at least this corner. When used at all corners, however, this method provides some protection for possible sharp corners of the container.

Corner element 71 in FIG. 12D and FIG. 12E is usually made of a thermoplastic material, and can be processed to its final shape by Injection molding. This protective Corner element 71 can have a matching color with surrounding Edge elements 69 and 70 or can be made of transparent or clear plastic materials. FIG. 12A shows a sample application of a protective Corner element in one corner of a Cuboid prism container. As mentioned, Corner element 71 may be used for protection of other corners of the container as well but this option has not been shown for clarity.

The Corner element 71 snaps into the corner of the box, in a snap fit arrangement, and will not fall off easily. The internal face sides 75a sit on faces 73 and 77 of adjacent Edge elements, and two ribs 74 and 78 engage with sides 72 and 76 of the adjacent Edge elements. If the side they are mounted on is an Open side the ribs 74 and 78 can be longer to provide more grip or strength. In addition, as seen in FIG. 12D, which is detail view-A, the internal faces 85a and 89a will sit against two other faces 83 & 87 of adjacent Edge elements in FIG. 12C, which is the detail view of that corner in view-B. Meanwhile, two smaller protrusions 84 & 88 in the Corner element will snap onto faces 82 and 86 of the adjacent Edge elements.

The structural design of this element allows ease of mold making as well. Rib 80 is an optional feature in this design that will add to strength of the Corner element and also helps in holding the adjacent Edge elements in proper angle (here right angle) with respect to one another one when loads are applied.

In FIG. 12E another design of the Corner element is shown as 71a with a splitting slot 91 between two sides 85a and 89a to make assembly and snapping of Corner element easier for stiffer plastic material choices. Wall thickness of the Corner element may also be adjusted to have proper stiffness. In addition, the Corner elements will be in contact with supporting or sitting surfaces underneath of the container. In such case the Corner element will act as a small bumper or cushion underneath the whole container and prevents rubbing of Edge elements and damage to them over time.

The material for Corner element can be selected to satisfy its main purpose which could be, for example: as a corner lock for securing the Free-ended Edge element; for protection of corners; for cushioning; or for strengthening, and/or some combination thereof. If desired, in order to have the container sit securely in place and not to slide easily, the material of the Corner element can also be selected to have higher coefficient of friction. Also the material may be selected so as to be more "rubbery" or impact resistant, in order to act as bumper for taking impacts from contact loads.

Moreover, as mentioned before, the color or transparency of the material may be considered when selecting a material. Also two type of materials may be used at the same time, for example by using Co-Injection or barrier molding methods during injection molding process, in order to provide a combined effect. As an example the Corner part may have a stiff internal thermoplastic that is covered with a material with higher coefficient of friction on surface such as TPE. Corner element 71 and 71a may then be used over all eight corners of the shown container in order to protect all corners and to lock movement of the last assembling Edge element or elements, or the Free-ended Edge elements, without the need for another locking feature (such as screw, set-screw, or lock). In this case, the Corner part acts as a locking feature. As such, Corner elements 71 and 71a may be considered as a joining method between any two Edge elements (similar to attaching the two Edge elements with a screw). These Corner elements can be designed for other angles between Edge elements in a plane, such as, for example other polygon Prism designs such as Hexagon prisms that will be discussed hereinbelow. In such cases, the angle between the related faces will follow the shape and angle of the related corner area. The Edge elements can also be in preloaded contact between two items 84 & 75a, and also 88 & 75a, to hold the Free-ended Edge element or elements more securely in place.

Sample Designs of Hexagonal Prisms:

While the previous discussion described the assembly of a cuboid shaped container or display, other container or display shapes can be produced. In another example, the fabrication of a container or display in shape of regular Hexagon prism with equilateral shape of bottom Sheet element (same length of sides for bottom Sheet element), is described.

Hexagonal Sheet element 1200 which is in bottom sheet, is shown in perspective in FIG. 13A and a detailed view A showing one corner, is shown in FIG. 13B. Grooves 1201 and edges of 1203 at outer edge of Sheet element are also shown.

Figure 14:
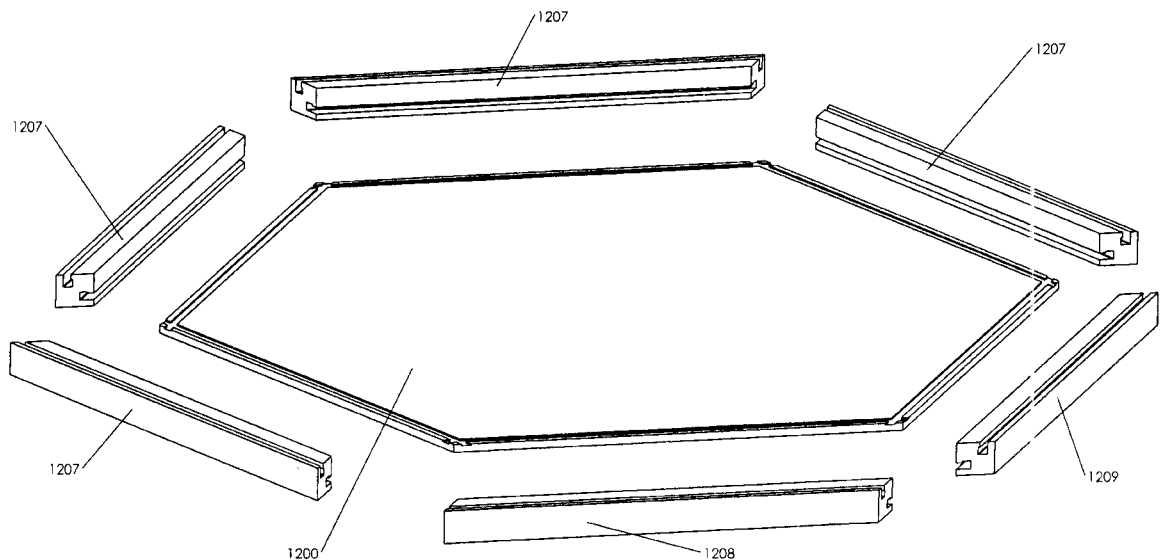
FIG. 14 shows a Hexagon Sheet element for the bottom of a Hexagon prism container, together with Edge Elements around the Sheet element.

The Edge elements to be used around Hexagon Sheet element 1200 have the same profiles as in FIG. 2 but they have the proper angle cuts at their ends to create a closed hexagon with suitable Mating Edge elements. FIG. 14 shows edge elements 1207, 1208 and 1209m around Hexagon Sheet element 1200, in an exploded view. All shown Edge elements 1207 will slide into matching grooves offset from outer edges of Hexagon Sheet element 1200 and they will have End-to-end sliding joint. In this embodiment, the four Edge elements 1207 will be same length while edge element 1208 will be shorter and last assembled Edge element 1209 around bottom hexagon Sheet element 1200, will have the longest length in this embodiment.

Figure 15:
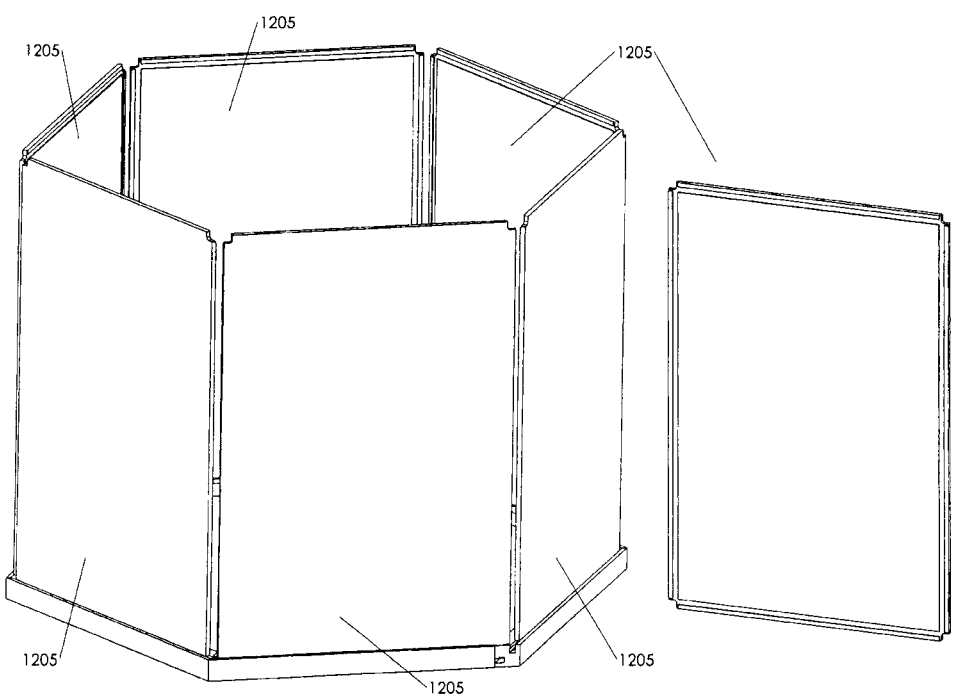
FIG. 15 shown the assembly of the side, rectangular Sheet elements of a Hexagon prism.

All rectangular Sheet elements 1205 at the sides of the Prism will engage by sliding into grooves of Edge elements around Hexagonal Sheet element as shown in FIG. 15. Rectangular Sheet element 1205 has straight grooves close to all outer edges similar to the Cuboid shape design in previous sections (See FIG. 3D as similar example).

If bottom Hexagon did not have equal length of sides (non-equilateral design) the length of Edge elements and side rectangular Sheet elements would vary accordingly. Also the angles of various cuts for the ends of Edge elements would have to varied to provide the proper Matting contact at their ends. This condition would also apply to any non-equilateral Polygon prism container.

Then Edge elements 1212 on the side of prism will join rectangular Sheet elements to one another by sliding from top with End-to-end sliding joint as shown in FIG. 16A & FIG. 16B. These Edge elements have grooves that are similar to FIG. 2 but in different profile shape that suits Hexagon shape prisms as shown in FIG. 16C.

As shown in FIG. 17, for a Strong Open design of the Hexagon prism with Edge Elements 1217, 1218, 1219 on Top, the top Edge elements are similar to the bottom ones but with only one groove (similar to the Edge element shown in FIG. 2B). These Edge elements will slide into the top edges of rectangular Sheet elements in an End-to-end sliding joint.

Also for a Closed design of the Hexagonal Prism, as shown in FIG. 18, an additional Hexagon Sheet element 1225 is provided on top of the container. In this design option, top Edge elements 1227, 1228, and 1229 will have two grooves (which is the same as the Edge elements on the bottom, and similar to the Edge element shown in FIG. 2A).

Figure 19A:
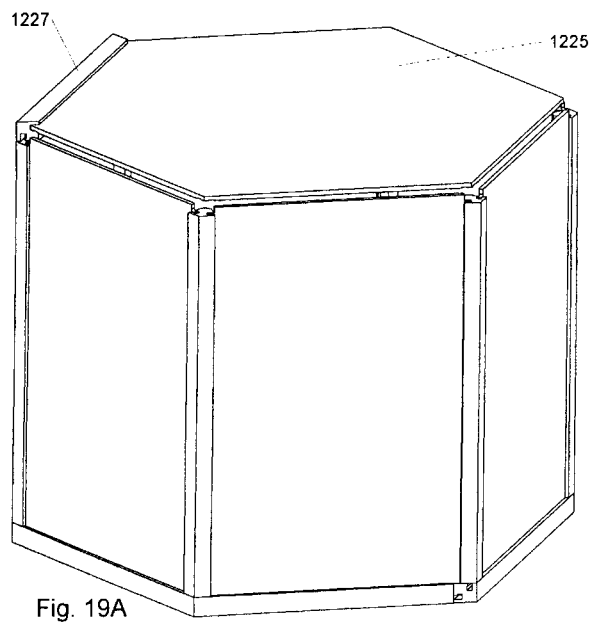
FIG. 19A & FIG. 19B shows a first method of assembling the Top Hexagon Sheet element for the Hexagonal prism container shown in FIG. 18.
Figure 19B:
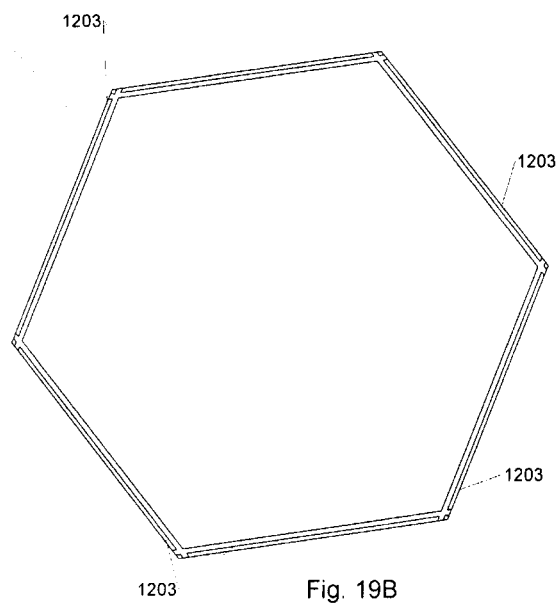

The top Hexagon Sheet element 1225 may have two preferred embodiments with two methods of assembly. The first embodiment is mirror of the bottom Hexagon Sheet element and it has engaging areas at the edges of grooves 1203 in all six edges as shown in FIG. 19B, and assembly of the Top sheet element requires its engagement to one of Top Edge elements at first with an End-to-end sliding joint (for example one of Edge elements 1227), as shown in FIG. 19A, and then sliding the five other top Edge elements. The Edge element 1229 will be the final sliding element, in a manner similar to that shown in the fully assembled container shown in FIG. 18. In this embodiment each slot in each Edge element engages with an edge of a Sheet element with End-to-end sliding joint. In addition, there is a Sheet element at both top and bottom, and this prism container is termed as a Strong Closed Hexagon prism container.

Figure 20A:
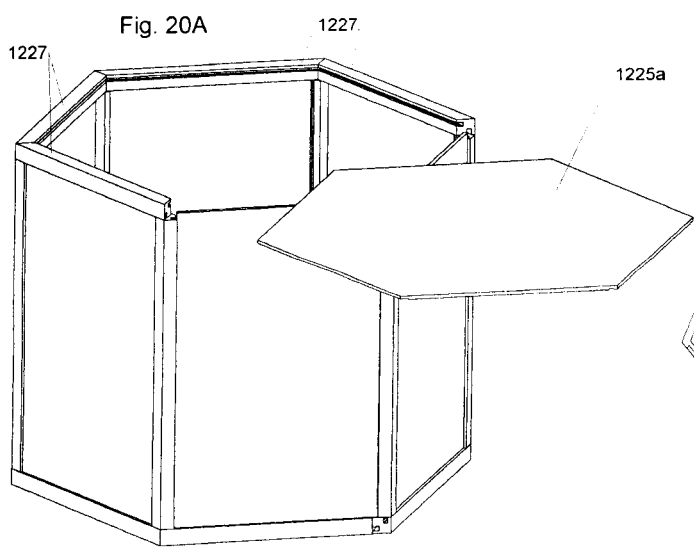
FIG. 20A & FIG. 20B show a second method of assembling the Top Hexagonal Sheet element for the Hexagonal prism container shown in FIG. 18.
Figure 20B:
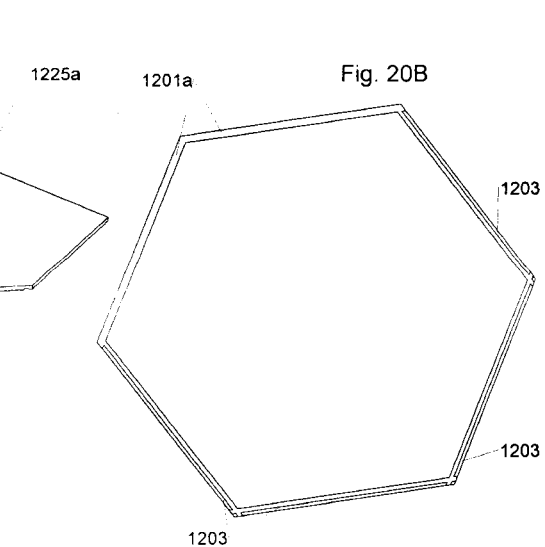
Figures 21A, 21B, 21C, 21D:
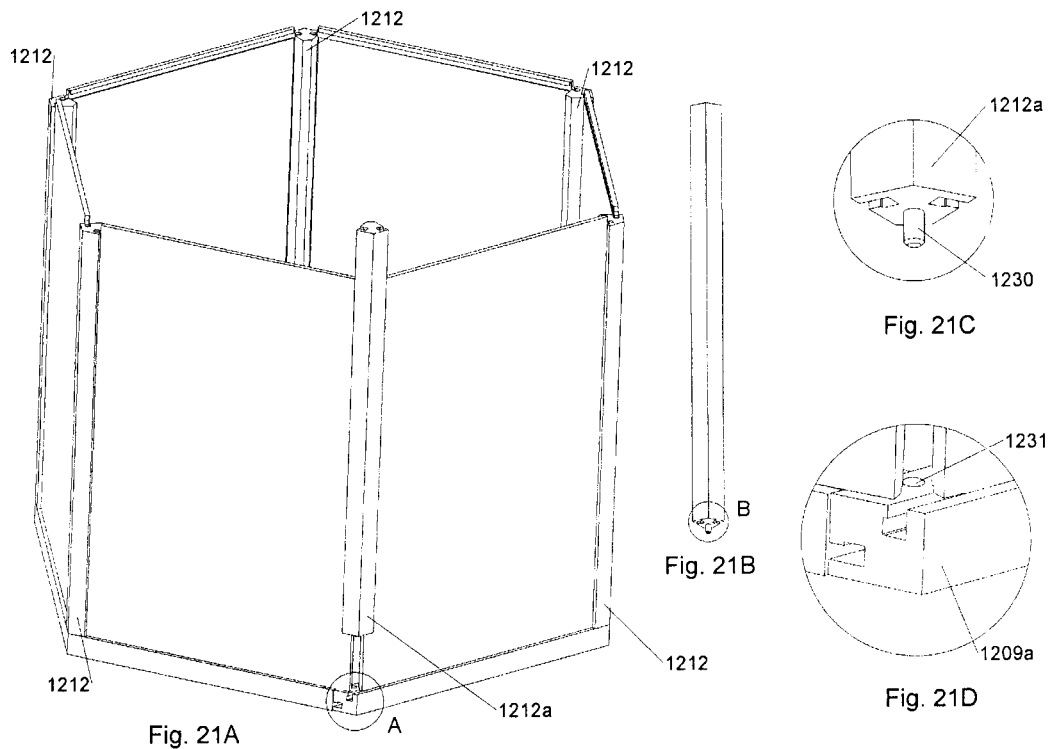
FIG. 21A to FIG. 21D show one preferred method for securing a Edge element.

The second embodiment and another method of assembly is based on removal of engagement edges 1203 (see FIG. 19B for comparison) in which two sides of the Top Hexagonal Sheet element 1225a are produced having a wider flat area 1201a (or having rabbet cut) as shown in FIG. 20B and then sliding the Hexagon Sheet element into two pre-assembled top Edge elements 1227 at the same time, as shown in FIG. 20A. This is very similar in concept to the engagement shown in FIG. 6A, and this method will make the assembly easier in some applications but might slightly reduce the strength of the container due to a fewer number of engagement surfaces between the Top Edge elements and the top Hexagonal Sheet element. In any case, the strength of the assembled container will depend on type and direction of applied forces, and the design can be adjusted accordingly. Overall, the final assembled container will look like the one shown in FIG. 18.

A further alternative option would be the elimination of wider groove 1201*a* in Sheet element 1225*a* and instead making a wider slot on two of the last engaging Edge elements 1227, and adding a simple slot groove similar to grove 27*b* shown in FIG. 6B.

In all of the above mentioned assembly methods and embodiments shown in the shape of Hexagon prism, all Edge elements around Top side, Mate one to another and at the end only last assembled Edge element on the Top of Hexagon (which is item 1219 in Strong Open Hexagon prism design shown in FIG. 17, or item 1229 in Strong Close Hexagon prism design shown in FIG. 18) is Free-ended and only the last assembled Edge element does not Mate with any other Edge element. Also in all of the above mentioned assembly methods the Edge elements around bottom Sheet element 1200, Mate one to another and the last assembled Edge element in the bottom Sheet element is item 1209 that is Free-ended and this Edge element does not Mate with any other Edge element. In summary, FIG. 17 & FIG. 18 represent two different embodiments of Hexagonal containers with two Free-ended Edge elements when fully assembled.

Some Additional Features or Embodiments of Hexagon Prism Design:

Securing the Last Assembled Edge Element in Bottom:

FIG. 21A to FIG. 21D shows another embodiment of a Hexagon prism container that allows securing the last assembled Edge element in bottom 1209*a* without using other components. Engaging the Edge elements 1209*a* with the adjacent perpendicular Edge element 1212*a* will secure the position of Edge element 1209*a* and prevent it from accidentally sliding out of position due to vibration. Also if desired, in order to have a fully locked container, the feature shown in FIGS. 21A to 21D, simplifies the locking method by using only one set of locking latch or mechanism at the end of assembly. One preferred method of Mating between Edge element 1209*a* & 1212*a* is shown, and this is accomplished by engaging a recessed area 1231 (here shown as a hole) on Edge element 1209*a* and having a protrusion 1230 (here shown like a dowel) on the bottom of Edge Element 1212*a*, during assembly of the container. Alternatively, the position of the protrusion and recess could be reversed, which means having the protrusion on Edge element 1209*a* and having an engaging recess on Edge element 1212*a*, for Mating the Edge element.

By providing proper Mating in the last assembled Edge element 1209*a* in the Bottom section, and by securing it in place, the entire Hexagon prism will remain with only one Edge element with only one Free-ended Edge element and only one degree of the freedom. This means no Mating at only one end for the last assembling Edge element in the top section, which could be the Edge element 1219 for a Strong Open Hexagon prism embodiment, or the Edge element 1229 for a Strong Closed Hexagon prism embodiment.

Figures 22A, 22B:
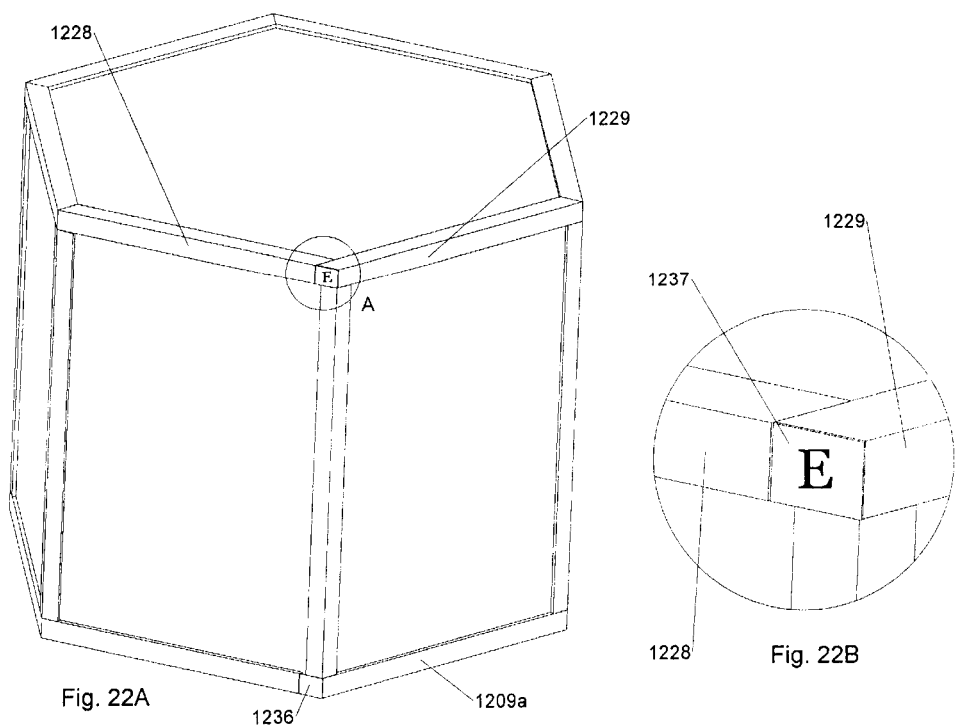
FIG. 22A & FIG. 22B show an assembly having end covering caps on the end of selected Edge elements.

Covering the end of last assembled Edge elements 1209 (or 1209*a* in the alternative design variation), or 1219 and 1229 will help improve the aesthetic look of the product. In addition, the covering can be used as an indication for conveying the method of assembly (by having different color or signs). FIG. 22A and detailed view-A in FIG. 2B show thin covering 1236 & 1237 at end of Edge elements 1209*a* and 1229. These thin sheets can be made from thin plastic sheets or available veneer products and these can be adhered to the end of the Edge element profiles by adhesive (heat adhesive or cold adhesive as common methods of assembly for veneer). Another option would be using an end cap similar to 47 in FIG. 24.

The marking "E", on end cap 1237 at the end of Edge element 1229 will indicate that this Edge element is the Free-ended Edge element or is the last Edge element for assembly (or first Edge element for disassembly).

If there was no protrusion (or dowel in the shown embodiment) used between Edge elements 1212*a* and 1209*a* to lock them with respect to one another during assembly, this design would look like FIG. 18. In that case, the end cap or end cover 1237 would be used at the ends of both Free-ended Edge elements, or at the last assembling Edge element 1229 on the top, and on the last assembling Edge element 1209 on the bottom (combination not shown). Consequently, the Edge elements on Top could get disassembled independent of the ones in the bottom. As a result, there would be two last assembling Edge elements or two Free-ended Edge elements, where one is on top of the Hexagon and one is on the bottom of the Hexagon.

Lock for Last Assembled Edge Element:

FIG. 23A and FIG. 23B show a sample design for providing a securing or locking latch at the end of the Free-ended Edge element or the last assembled Edge element (1229 in shown design). The mechanism demonstrates a sample locking method for added security. In the shown lock design, item 1011 is fixed to edge element 1228 while item 1010 can slide back to allow disassembly of last Edge element 1229. A common locker style lock can be placed between rings 1012 & 1013 to hold the mechanism in its locked position (not shown for clarity). Many other locking mechanisms or fasteners can be implemented in similar way to secure the last assembled Edge element (Free-ended edge element).

It will be noted that similar to Cuboid prism design, designs with Hexagon Shelf Sheets (along with vertical Edge elements with dowels) and supporting bases on Hexagonal or rectangular sides can be used, in the Hexagon prism design. Also doors and hinges can be incorporated into any selected Sheet element similar to those shown for the Cuboid prism design in FIG. 1A.

More generally, similar to all above-mentioned designs and features for Cuboid and Hexagonal Prisms, the same designs and features can be incorporated into any Polygon Prism design having "N" sided polygon Sheet elements on top & bottom, "N" Edge elements on top, "N" Edge elements on bottom, "N" side Edge profiles (angled to match angles of edges on top & bottom Sheet elements), and "N" side rectangular Sheet elements. As such, containers or displays with a wide variety of shapes can be fabricated.

It should be noted though, that if the corner angles of the top and bottom Sheet elements are not same, the angles of grooves for vertical Edge elements will follow same way and won't be identical as well. Also the width of all side Sheet elements will not be same. However, if all of the corner angles on the top and bottom polygon Sheet elements are the same, the angle of the corners for "N" sided polygon will typically be "180*(N−2)/N" and the angle between the grooves of vertical Edge elements will be same. Additionally, the width of all side Sheet elements will be same. In general any Polygon Prism can follow very similar concept designs to create a Strong Closed or Strong Open container.

The same concept can also be applied to the added features such as shelves, shelf supports, locking, end caps, and side or top access hinged doors.

Further, similar principles can be applied to any polyhedron which is a 3-dimensional shape with faces in shape of a polygon.

Other Designs for Supports of Shelves:

Shelf Sheet elements can be supported with dowel pins 2021 as shown in FIG. 4. However, a preferred design for support of shelves is shown in FIG. 25A & FIG. 25B. In this design, Shelf Support 61 is designed to be able to engage with two dowel holes 699 that are provided on Edge elements. In this case, the dowel holes are shown having the same elevation. Shelve Sheet elements will securely sit on area 62 of shelf support 61, and the two pins 63 will fit into Edge profile holes. Two ribs 64 can deform slightly to allow easy installation of the shelf support on an Edge element. There is shown an optional separation area 66 between these two ribs. In use, faces 65 can be in touch with inner sides 60 of the Edge element. FIG. 25C shows a detailed view-A of the assembled shelf support.

The most suitable material for these shelf supports is thermoplastic materials and the best method of manufacturing these supports is injection molding, although the use of other materials and production techniques is not excluded. Each polygon prism design can be modified to incorporate a similar support design to that shown in FIG. 25B. The angle between the two faces 65 should be considered for each Polynomial Prism. Therefore, as an example, in FIG. 21A & FIG. 21B, very similar design of shelf holes and supports can be considered to be installed on vertical Edge elements 1212 & 1212a (not shown) in the Hexagon prism design. Similar supporting component (with a proper angle between faces 65) can be considered for any polygon prism design in order to match the angles on the related vertical Edge elements. Undercuts 64a can also be used to allow ease of removal of the shelf support during disassembly by using a simple tool like flat head screwdriver or similar to disengage one side and then puling away in a direction perpendicular to the other side.

Other Designs for Edge Element (Different Extrusion Profiles):

Edge elements can be made by machining solid materials such as wood, plastic, or metals. Another option though is manufacturing them with extrusion process. Edge elements may have some holes on end face or may have through holes that are made during manufacturing with extrusion process from metal or plastic. For example holes 1971 are shown in FIG. 26A. These holes will help in reducing the weight, provide a reduction in bulk of material in general profile, and can be used for attaching end caps or bolts (when tapped) for some attachments or assemblies. In addition, holes in the profile may be used for transfer of electric wires within the container or display. For example, for LED lighting, related wires can pass through these holes for better protection of wires and also better look of the design. Also additional groove/grooves can also be added for the passage of wires. FIG. 26B shows example of added dovetail groove 1975 for passage of wire.

In this embodiment, the groove for the electrical wires is designed such that the wire can be pushed into the shown groove and will not come out by itself but can be pulled out if needed. Also the wire can be fished through the groove.

Other samples of extruded Edge element profiles are shown in FIG. 27A to FIG. 27F. FIG. 27A, FIG. 27C, and FIG. 27D shows examples of slotting through various holes. FIG. 27A shows an example of slotting using one of the through holes. The slotting process helps strengthening the extrusion die and also allows ease of access to holes.

FIG. 27E and FIG. 27F show more hollow extrusion profile designs for different wall thicknesses. It should also be noted that the design of FIG. 27E might also be made by roll-forming process of sheet metals. Also for some applications the Edge Profile may be made by joining two simpler profiles. The joining may be done by some sort of welding or by using some type of adhesives as shown FIG. 28. Also two separate profiles can be joint right after extrusion or be manufactured by co-extrusion process to have different properties at different sections of profile.

Edge element profiles may have a chamfer or radius 1301a as shown in FIG. 2A for ease of assembly of Sheet elements that have a radius at the root of their corner cutouts instead of having sharp corner cutouts. For example, see the corner cutout 120 in FIG. 3E. If the corner cutouts of Sheet elements are machined by a routing process, a radius will remain at the root of corner cut. To prevent interference of the Edge elements with this radius on corner cutouts of Sheet elements during assembly and similarly to provide closer fit of shelf elements, in corners with Edge elements around it, a chamfer (or radius) similar to 120 in FIG. 3E may also be considered. Chamfers 1301 and similar in FIG. 2A might also be provided in outer edges of the Edge elements in order to eliminate having sharp corner areas. These chamfers and similar ones are not shown in some figures to simplify them, but their use would be well within the understanding of the skilled artisan.

Another feature that may be considered for the Edge element is having a seal with a rubbery nature, as a soft lip, to partially seal off the gap between Sheet elements and Edge elements and to minimize penetration of dust or other matters into inside of the container. The seal might be incorporated as separate item and get adhered to the main substrate but might also be provided by co-extrusion of seal material with the main Edge material during production of extruded profiles.

FIG. 29A to FIG. 29E show a sample application of the several Knockdown Containers as a showcase display. The two Main knockdown containers 1460 and 1492 shown in an exploded view in FIG. 29A are very similar in structure and construction to those displays shown in FIG. 1A, FIG. 1B, FIG. 5A and FIG. 5B. The Sheet elements can be made of a wide range of materials, colors, and textures with variety of optical properties, such as being transparent, translucent, or opaque. Ease of assembly and disassembly of main knockdown containers 1460 and 1492 allows their use in tradeshows and shipping them safely. In FIG. 29A, the whole structure is placed on supporting base assembly 1402. Bottom faces of Edge elements of knockdown structure 1460 will sit on face 1404 of the base. Face 1406 will be in close proximity to bottom Sheet element of knockdown structure 1460 in order to support any load placed inside the container, on bottom Sheet element of container 1460. Edges 1408 of the base will be in contact with sides of bottom Edge elements of 1460 and prevent any side or sliding movement of container 1460 with respect to base 1402. Fasteners 1442 will secure container 1460 and the bottom electric container 1414 to base 1402. Lockable casters 1410 are included for ease of moving the entire assembly. Groove 1412 is also included for passage of power wiring and plug 1430 to a plug outside of the entire display.

An alternative design of supporting base assembly may be a revolving base to allow the entire assembly to rotate on a thrust bearing mechanism on its base (not shown). In such case, there will be another supporting base plate under main base. Also it is possible to have both revolving base and casters considered in one package. In such condition, the revolving mechanism will be between two base plates and the casters will be under the bottom main base plate (not shown).

The bottom electric container 1414 is used to organize the wiring and power supply elements. This container will be placed inside the Knockdown container 1460. The bottom sheet element of container 1460 has few holes that match holes 1421 of the 1414 electric container and threaded holes or thread-inserted holes 1409 on the base and screws 1442 will pass through these holes and are fastened to the base. Therefore, both containers 1414 and 1460 can be secured to base 1402. The bottom electric container 1414 has two options. First option is shown as 1414*a* and it is used when it is desired to directly connect the 1430 plug to regular outlets, for example 110 VAC electric outlet. The second option for powering the lighting is shown as 1414*b* and it is used when it is desired to have the option of either directly connecting plug 1430 to 110 VAC or to operate the lighting system with a battery system, wherein plug 1430 is not connected to power line.

The structure of the bottom electric container may have different designs but the one shown in FIG. 29D has four sides 1417, bottom sheet 1419, and top lid 1416. Supports 1424 are preferably placed in the middle to structurally provide some support underneath the cover sheet 1416 and also to divide the space to several compartments that allow wiring to pass easily between spaces. There are numerous different design options for the supports 1424 but in the shown design, both ends of these supports are engaged in a groove in sides 1417. Two supports 1424 have a slot in middle area that allows both of them to get assembled in cross shape. These structural features allow ease of placement and removal of supports 1424 whenever needed.

The top edges of side elements 1417 are recessed towards the inside to allow lid 1416 to securely sit in the recessed area. Supports 1424 have some holes such as 1426 to allow passage of wires and terminals between the created compartments in electric container 1414. Sides 1417 have openings 1428 on them to allow all supply wires 1436 and quick disconnect plugs 1438 pass to individual lighting systems such as lighting plate 1472 and spot light 1482 as shown in this example.

In this example, the preferred type of lighting is using LED lighting. However, other systems of lighting can be used in similar way. Other features might be modified, or optionally included. For example, some key electric components that might be included, are an AC adaptor 1422, for converting 110 VAC to 12 VDC for LED lights, optional dimmers 1440, or quick disconnect splitter with input of 1432 and outputs 1434 that get connected to plug 1438 for powering LED lights.

A second powering option is shown as item 1414*b* in FIG. 29C, wherein the input of the battery charger 1448 is plugged into 110 VAC and its output cables gets connected to terminals 1450 which have separate positive and negative connections of 12 VDC supply. Then the terminal also gets connected to matching poles of each rechargeable battery 1452. The output voltage line, for example at 12 VDC, goes first to a splitter, then to dimmers, and finally to LED lights similar to the approach explained for electric wiring container 1414*a*.

There are some filler blocks 1446 that are made of foam or other similar materials for securing the batteries or other loose components in place.

The switch 1456 is used for ease of turning the LED lights on and off if remote control is not handy. In the design shown in FIG. 29A, the bottom Knockdown display 1460 has a separate lighting plate 1472 on top, and this is shown in more detail in FIG. 29B. The lighting plate 1472 has two functional purposes. One function is lighting, here shown towards bottom side but it can also have lighting towards top and bottom side as well, with a proper LED light selection. The other function is acting as a mechanical support that sits on top Sheet element 1465 of the bottom container 1460 while it is placed in recessed area created by top edges 1463 of four Edge elements that are surrounding Sheet element 1465. The thickness of the lighting plate 1472 is considered larger than the above-mentioned recess to allow engagement of 1472 with four Edge elements on bottom side of top Knockdown container 1492 as well. Also the thickness of 1472 is considered such that it provides some support for bottom Sheet element of container 1492 when heavier loads are placed inside 1492. Screws 1462 and nuts 1476 can pass through few designated holes 1464, 1474, and matching holes on bottom Sheet element (not shown) of container 1492 for connecting Top container 1492 to bottom container 1460. Further some of these holes can be used for securing the spot lights 1482 in place. Externally threaded hollow shaft 1488 and nut 1490 will also help in securing two top and bottom containers 1492 and 1460.

The lighting plate 1472 is comprised of plate 1479 with some recessed grooves for placing LED strips 1480. The LED strips are interconnected with proper wires in between, and with quick disconnect terminal 1478 as feed power while other similar methods may be used as well. Other elements of the Spotlight 1482 are stem 1485, pivot joint 1486 and spotlight head 1484. Spotlights have wiring 1470 that is connected to a miniature disconnect 1469 and quick disconnect 1468 at the end, for connection to a linking cable to electric power such as wiring cable 1436. Details of interconnecting wirings are not shown for clarity. Holes 1418 can be used for using longer screws than 1442, in order to secure the lid 1416 in place, if needed. They might also be used for using a tool or handle for lifting the lid 1416 whenever needed to have access to inside of 1414. A optional diffuser sheet can also be added on 1479 to distribute the light more uniformly (not shown). Optional remotely controllable lighting dimmers can be used for all lighting systems to allow adjustment of light intensity. Also remotely controllable color changing LED lighting with wide range of color changing patterns can be incorporated in all shown LED lightings.

Other Lighting Options:

A) Incorporating the LED Lighting Directly on any Selected Sheet Element:

Surface LED mount: For example in FIG. 29A, instead of having a separate plate 1472 that holds the LED lighting and have it placed on top of Sheet element 1465, LED lights may be directly mounted (usually using LED strip lights with adhesive in the back or by using similar mounting methods) on Sheet element 1465 as shown in FIG. 30. The LED pattern 1480 shown in FIG. 30 is just an example and many other pattern options can be used. The same lighting concept can be applied to any Sheet element of the display. Quick disconnect 1478 allows ease of assembly and disassembly.

Recessed LED mount: Another option for lighting is to make a sheet element 1580 as shown in FIG. 31A to FIG. 31E that has LED lighting inside the recessed cutouts on its face, or has the LED lighting mounted on its face (not shown). In this design, Sheet element 1580 will replace both sheets 1465 and 1472 of FIG. 29A. In such case, the Sheet element 1580 will have larger thickness 1582 in its center areas while its edges will follow the previously shown shape and profile for generic Sheet elements in order to allow the same type of sliding engagement with the Edge elements around it. The extra thickness portion 1582 of this Sheet element can engage with bottom Edge elements of the adjacent display container 1492 and aid to position it. A diffuser sheet can also be added to the front face to distribute the light more uniformly (not shown).

If desired, in order to prevent or limit the passage of light from back side of the sheet elements, opposite to LED side, that are shown in FIG. 30 and FIG. 31A, a thin layer of film (opaque or translucent) can be mounted on back side, such as by using adhesive decals, or the back side can simply be painted.

If desired to have lighting on both sides of the Sheet element when LED is mounted on their surface or when they are recessed in, a transparent material can be used for the Sheet element along with LED lighting beads or similar LED lighting strips that emits light in both faces and mounting the LEDs with some adhesive or local clamps to the Sheet element (not shown).

B) Lighting a Container from Inside to Glow as a Light-Box:

The Sheet elements of a display can be made of a translucent material (white or color) or of a textured material (clear, white, or color). The translucent or textured material allows passage of light from inside toward the outside, while the details of the internal content and lighting will not be visible from outside. By using color changing LED lights or placing LED lightings with a rotating head (in one, two, or three angular directions) the moving lighting path will create an interesting light box that will draw attention.

C) Lighting a Container by Placing LED Lights Inside the Main Groove/Grooves of Selected Edge Elements and Lighting the Adjacent Sheet Elements from their Edge/Edges:

This design creates an interesting glowing effect in some clear sheets, transparent sheets with some tinted color, and also in some partial translucent sheet materials such as sheet elements made of Acrylic. Also this lighting method can be used for illuminating the clear Sheet elements that are covered with a thin layer of opaque or translucent material such as paint or printing. The printing can be directly printed on the Sheet, or can be provided by mounting a decal on the face of the Sheet element. In such case having a special texture pattern on the inside face of the Sheet element helps in more uniform distribution of the light from behind and looks like a back-lighted condition. The edge lighting effects will be interesting as well when used with some carving or lettering that is machined onto Sheet elements. This indirect lighting method saves space especially for containers where their inside space is needed for placing other objects. Implementing uniform lighting on Sheet elements using other methods would require space and wiring, especially if it was desired to use the design for creating glowing pictures that are illuminated from behind similar to backlit lighting.

FIG. 32A to FIG. 32F shows different views of an example of an Edge element assembly 1702 including main Edge element 1602 and LED lighting strip 1606 that are placed inside the groove/grooves of the Edge element. FIG. 32E is detail view of FIG. 32D and shows a cross section of LED strip 1606 which includes LED lights 1606a, Strip Base 1606b that has an adhesive in back, and terminals 1606c that get connected to wiring 1610. The wiring 1610 is fished through hole 1620 and the other end of it is connected to quick disconnect 1608 that will receive power provided by, for example, a DC voltage from a battery or from a power adapter. In the shown example, the shape of slots in the Edge profiles can be modified, compared to the previously discussed "L"-shape design that was shown in FIG. 2A and FIG. 2B, if needed. The modified slot still has faces 29, 33, 35, 37 but in this option, has an additional simple groove on face 31 of the original Edge profile 11 that splits the face 31 to two portions 31a and 31b in this new profile. Therefore, three new faces 1614, 1616, and 1618 will be created by adding above-mentioned groove. This new groove is flat in bottom face 1618. The base of LED 1606b that has adhesive in back will be mounted on bottom face 1618. The other option is having the width of groove match that of the LED strip, and thus provide a tight fit for the width of LED the strip. The LED strip is held in place by forced fitting the LED strip into the groove. The depth of 1618 from faces 31a & 31b is preferably deeper than the overall thickness of LED 1606. This will provide a gap between LED strip 1606 and any Sheet element that is going to be assembled by sliding into the slot. Two flat faces 31a & 31b will prevent collision of assembling Sheet elements with the LED strip.

Chamfers 1628 in FIG. 32F, which is detailed view-B of FIG. 32C, are optional in order to remove sharp edges close to wire. The cutout 1622 is shown as a round pocket with a pilot hole of 1624, and this provides some room for wiring from LED terminals 1606C to be fished through channel 1620. To protect the joint at terminal connection of the LED strips, drilled hole 1626 in FIG. 32B may be provided at the end of main Edge profile body and a set screw 1612 may be used for retaining the wires inside channel 1620. It's possible to use a threaded insert and setscrew inside drilled hole 1626 as well (not shown).

The LED strip may be added to one or both slots of Edge elements. Here, the LED strip is shown in both main slots of an Edge element that is used for the designs with shelves. The end of the Edge element has a straight cut and as an example these Edge elements with lighting in them can replace items 2010 in FIG. 4F.

D) Lighting the Content of a Display Locally with Adjustable Spotlights:

FIG. 33A & FIG. 33B show an example of an adjustable spotlight with base 2040 that is shown in more detail in FIG. 33C and FIG. 33D. The base 2040 can be mounted into two holes 2030 & 2031 on the inner faces of an Edge element 2010 while elevation and direction of applied light can be adjusted easily and the base assembly can be assembled or disassembled rapidly. Spotlight 2041 is shown just as one example of numerous available designs that can be mounted to base 2040. In this example however, the spotlight 2041 is secured to its base with two fasteners in two holes 2056 and the wiring or quick connection terminal of spotlight 2041 can pass through opening 2055. To rapidly assemble the base and attached spotlight to Edge element 2010, pin or screw 2042 will slide into hole 2030 and then screw 2043 will be threaded into tap hole 2051 on base 2040 and then extended thread portion of screw 2043 will slide into hole 2031 or it may lightly engage in self taping condition with hole 2031. Faces 2053 & 2054 will be in contact with inner faces 2032 & 2033 of Edge element 2010. As a result the spotlight base will be secure in place in above-mentioned condition.

Figure 34A:
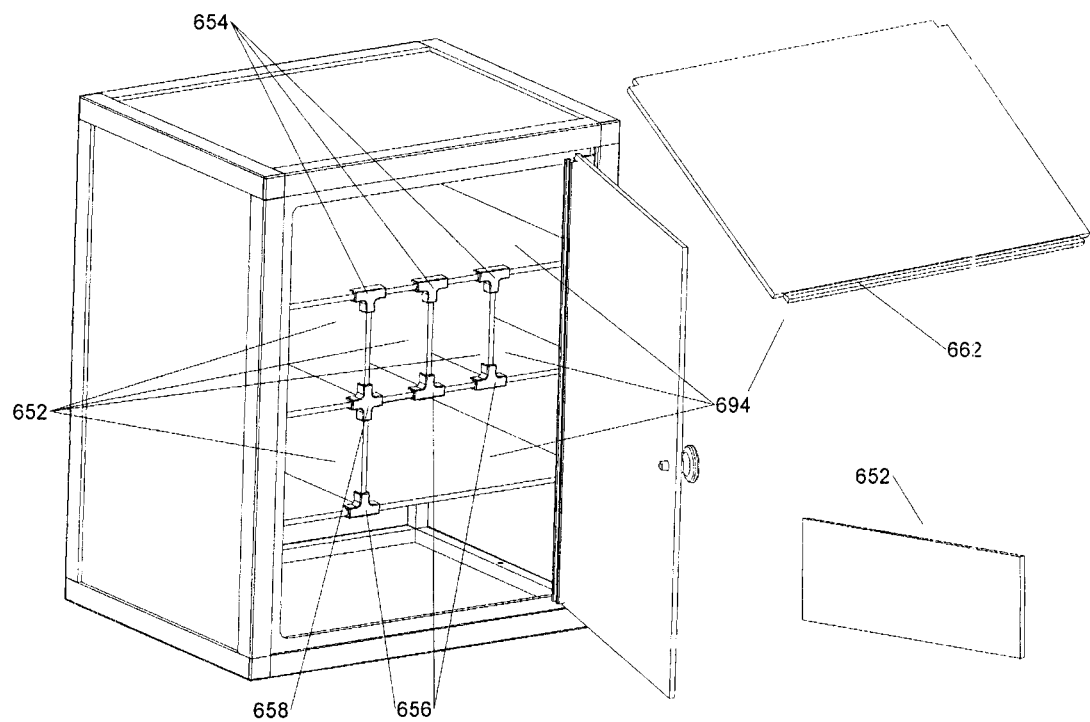
FIG. 34B shows implementing Shelf-Divider sheets and view of the related joints used in a sample container.

Dividing Space Between Shelves:

As shown in FIG. 34A, to split the space between two adjacent shelves into two or more regions, Shelf-Divider Sheets 652 can be used along with some Joint elements 654, 656, or 658. To position the Joint elements 654, 656, and 658 securely to Shelf Sheet element, a straight undercut groove is machined on bottom face of shelves 694 in FIG. 34A. The undercut groove 662 is offset from front edge of the Shelf Sheet 694 and it will create a snap fit with each of Joint elements.

The Shelf-Divider sheet 652 is a simple rectangular plate as shown in FIG. 34A that fits easily between two shelves and has almost the same depth as shelves 694.

Joint element 654 in FIG. 34A is engaged by snap fit to Shelve Sheet 694 on top and will locate the Shelf-Divider sheet 652 at any required position by sliding it along groove 662 of Shelf Sheet 694. For further securing the Shelf-Divider sheet 652 at any required position, the Joint element 656 can be placed on lower shelf as well, as shown in FIG. 34A. Having both items 656 and 654 in place for each Shelf-Divider 652 will provide a more secure and strong shelf structure while it can be disassembled easily.

In applications, where multiple shelves need to be divided, in such a way that two Shelf-Divider sheets 652 (for two adjacent shelves) are aligned in the same vertical plane, four sided joint element 658 is used. This element will engage (snap fit) with the groove 662 on the bottom of Shelf Sheet 694 as well. The position of this joint element along with the position of the attached Shelf-Divider sheet, can be adjusted by sliding Joint element 658 to required position.

Figure 34B:
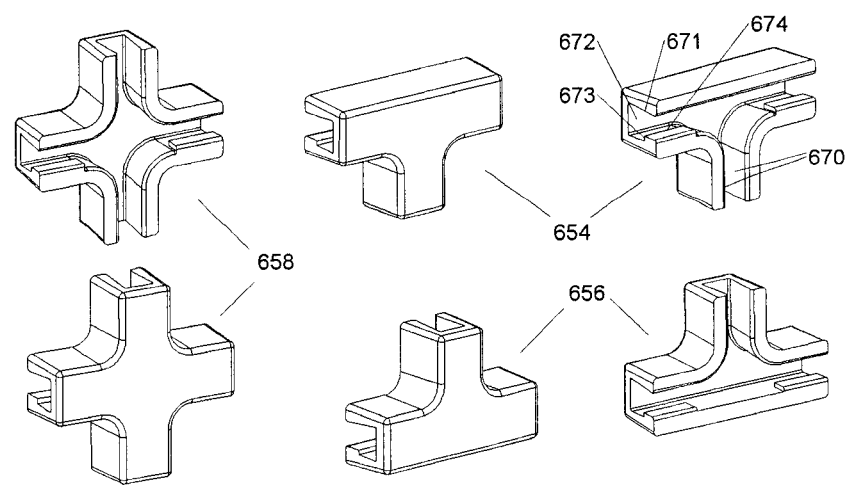

In FIG. 34B three types of Joint elements are shown individually. After assembly of Joint element 654, Shelf-Divider Sheets 652 will be held between Surfaces 670 while surfaces 671, 672, 673, and 674 will engage with groove 662 on Shelf Sheet 694. Joint elements can be manufactured by injection molding. The above-mentioned surfaces of Joint element 654 can have some flexibility so as to be installed by snap fit. These Joint elements can slide along the groove of Shelf Sheet 694 for adjustment of their position. Other joint elements 656 & 658 are designed in similar basis and have very similar features.

To increase the strength of the Shelf-Divider sheets, additional sets of Joint elements 654, 656, and 658 may be added on both ends of the Shelf-Divider plates 652 in order to have them supported on all four corners. To ease assembly of the Shelf-Divider sheets, with supporting Joint elements on both sides, and also to have access to the container from both sides, another variation of design is one where the container with two opening accesses from front and back (back access is not shown) is used. In such a design, an additional set of groove 662 will be added to other side of Shelf Sheet 694.

In an alternative design, adding grooves (similar to groove 662 on sheet 6941 to sheet 652 (not shown) may be considered. In this approach, the plates can be fit into joint items that will be very similar to 654, 656, and 658 with additional engaging areas on their side (left or right) as well. This design is not shown but it would have a snap fit on one of faces 670 (left or right), instead of having flat faces 670 on both sides.

In an alternative design, groove 662 on bottom face of Shelf Sheet 694 may be considered on top face (not shown). In such case, joint elements 654, 656, and 658 will be mounted at 180 degrees rotated position to fit properly. Having the grooves on the bottom side is preferred however, as dust is harder to get to grooves.

There has now been described a knockdown container and display which provides advantages over the prior art. It is clear though that other modifications and alterations to those shown in the drawings may be used in the design and setup of the present invention, which fall within the scope of the appended claims.

Additionally, for clarity and unless otherwise stated, the word "comprise" and variations of the word such as "comprising" and "comprises", when used in the description and claims of the present specification, is not intended to exclude other additives, components, integers or steps. Further, the invention illustratively disclosed herein suitably may be practiced in the absence of any element which is not specifically disclosed herein.

Moreover, words such as "substantially" or "essentially", when used with an adjective or adverb is intended to enhance the scope of the particular characteristic; e.g., substantially planar is intended to mean planar, nearly planar and/or exhibiting characteristics associated with a planar element.

Further, use of the terms "he", "him", or "his", is not intended to be specifically directed to persons of the masculine gender, and could easily be read as "she", "her", or "hers", respectively.

Also, while this discussion has addressed prior art known to the inventor, it is not an admission that all art discussed is citable against the present application.

The invention claimed is:

1. A knockdown container or display of the type having a three-dimensional shape wherein said container or display is constructed from two main structural element types comprised of at least one Sheet element; and a plurality of Edge elements,
   wherein said Sheet element is a sheet material having a polygonal shape having edges, and wherein at least a portion of the edge of each Sheet element defines an essentially planar, and substantially linear sheet edge area, and
   each of said Edge elements is an essentially linear shaped component having one or more linear slots along their entire length, and said Edge element form a framework wherein both ends of essentially all of said Edge elements are mated to an adjacent Edge element so that essentially all of said Edge elements are prevented from sliding in the direction of said adjacent Edge element, and whereby, essentially all of said Edge elements are secured in place in said framework,
   wherein each of said Sheet elements in said container or display is separated by an Edge element to which it is connected, in a sliding engagement, so that the edge of said Sheet element is positioned in, and slid within, the slot in said Edge element,
   wherein at least one end of at least one Edge element but not more than the end of at least three Edge elements, is a Free-ended and is not mated to any adjacent Edge element so as to allow said Free-ended Edge element to be slid away from sliding engagement with said Sheet element, and
   wherein once all Edge elements and Sheet elements are assembled they secure each other, and in final assembly condition only one Edge element will have a Free-ended end, and this Free-ended Edge element was the last assembled Edge element, so that only this last assembled Edge element will be able to move only along the direction parallel to its longitudinal profile direction.

2. A knockdown container or display as claimed in claim 1 having two Edge elements having an end which is Free-ended.

3. A knockdown container or display as claimed in claim 1 having only a single Edge element having an end which is Free-ended.

4. A knockdown container or display as claimed in claim 1 wherein any or all of said Free-ended ends are temporarily attached to an adjacent Edge element or Sheet element using a temporary locking device.

5. A knockdown container or display as claimed in claim 4 wherein said temporary locking device is a setscrew, a screw or a lock, or is a corner element.

6. A knockdown container or display according to claim 5 wherein said Corner element prevents the Free-ended end of said Edge element from moving, and wherein said Corner element is an element that is snap fitted at the corners of the assembled container so as to be in contact with said Edge elements at a corner area, and wherein the corner element is used for securing the end of at least one of the Edge elements.

7. A knockdown container or display as claimed in claim 6 wherein corner elements are fitted to two or more corners of said container or display, and provide some protection at the corner against sharp edges or damages at corner area due to possible impact loads during usage or handling of assembled container.

8. A knockdown container or display as claimed in claim 1 wherein said Sheet element and said Edge element are in one of two possible sliding engagements between said slot in said Edge element and said sheet edge of said Sheet element, wherein a first type of sliding engagement is an End-to-end sliding joint wherein the said slots in said Edge element will engage with a matching shape of the linear sheet edge of said Sheet element, from one end of said slot to the other end of said slot, by moving said sheet edge in a sliding manner in said slot, only while said slot in Edge element and said edge of Sheet element are in an essentially parallel orientation and aligned for engagement, and
wherein a second type of said sliding engagement is a Simple sliding joint between an Edge element and Sheet element, wherein the linear sheet edge of said Sheet element can also be slid into said slot in the Edge element while moving said Sheet element in a direction at an angle to the direction of said Edge element slot, and
wherein at least one sliding engagement for each Edge element is an End-to-end sliding joint.

9. A knockdown container or display as claimed in claim 1 wherein the knockdown container or display has shared Sheet elements or shared Edge elements with one or more adjacent knockdown containers or displays.

10. A knockdown container or display according to claim 1 where said Edge elements are manufactured using an extrusion process, and wherein said Edge elements are extruded in shapes which match the form for engagement with edges of Sheet elements where extruded profiles can be made from one or multiple pieces with same or different materials, or where multiple pieces can be bonded, adhered, or fastened together.

11. A knockdown container or display according to claim 10 wherein said Edge elements have at least one additional longitudinal groove or hole for the passage of wires.

12. A knockdown container or display according to claim 1 where selected Edge elements have slots that allow incorporation of LED strips or other similar lighting materials by inserting said LED strips or other lighting materials into said slots, or wherein LED strips or other lighting materials are mounted onto said Sheet elements or are incorporated into said Sheet elements.

13. A knockdown container or display according to claim 1 wherein the shape of the slot in Edge element is "L"-shape, and the L-shaped slot that extends along the entire length of the Edge element, and wherein the edge of the engaging Sheet element has a straight outer edge cut along with a straight groove that is parallel to, but offset from the straight outer edge, and wherein said straight groove extends along the entire length of the outer edge of said Sheet element, so that said groove in said Sheet element creates an step that will engage with an inner edge of the "L"-shaped slot.

14. A knockdown container or display according to claim 13 wherein sliding said Sheet element with said groove into said L-shaped slot in said Edge element, creates an End-to-end sliding joint.

15. A knockdown container or display according to claim 1 in the shape of a prism with a polygon shaped Sheet element either at the top or bottom but not both, so as to form a Strong Open prism container, or wherein said knockdown container or display is in the shape of a prism with a polygon shaped Sheet element at both the top and bottom, so as to form a Strong Closed prism container.

16. A knockdown container or display according to claim 1 additionally comprising shelves, wherein said shelves are created by providing shelf holes on the inner faces of selected Edge elements, which holes are directed towards inside of the container; and said shelf holes are used for installation of shelving supports, on which said shelves are positioned; and wherein said knockdown container or display optionally additionally comprises divider elements attached to said shelves.

17. A knockdown container or display according to claim 1 in the shape of Cuboid, Rectangular-prism, a Triangle prism, a Pentagon-prism, a Hexagon prism, or an octagon prism.

18. A method for the production of a three-dimensional knockdown container or display, wherein said method comprises providing at least one Sheet element, and a plurality of Edge elements,
wherein said Sheet element is a sheet material having a polygonal shape having edges, and wherein at least a portion of the edge of each Sheet element defines an essentially planar, and substantially linear sheet edge area, and
each of said Edge elements is an essentially linear shaped component having one or more linear slots along their entire length,
wherein each edge of said Sheet element is sliding engaged with said linear slot in said Edge element so that the edges of said Sheet element are positioned in, and slid within, the slot in said Edge element,
sliding engaging a further Sheet element with a second slot in said Edge element and placing further Edge elements around the edges of said further Sheet element;
repeating this last step until each of said Sheet elements in said container or display is separated by an Edge element to which it is connected, in a sliding engagement, and said Edge elements form a framework wherein both ends of essentially all of said Edge elements are mated to an adjacent Edge element so that essentially all of said Edge elements are prevented from sliding in the direction of said adjacent Edge element, and whereby, essentially all of said Edge elements are secured in place in said framework,
wherein at least one end of at least one Edge element, but not more than the end of at least three Edge elements, is Free-ended and is not mated to any adjacent Edge element, so as to allow said Edge element to be slid away from sliding engagement with said Sheet element, and wherein once all Edge elements and Sheet elements are assembled they secure each other, and in final assembly condition only one Edge element will have a Free-ended end, and this Free-ended Edge element was the last assembled Edge element, so that only this last assembled Edge element will be able to move only along the direction parallel to its longitudinal profile direction.

19. A method for the production of a three-dimensional knockdown container or display as claimed in claim 18 wherein said container or display comprises only End-to-end sliding joints, and has only a single Edge element having a single Free-ended end, and said single Edge element having a single Free-ended end is the last Edge element inserted into said container or display.

* * * * *